(12) United States Patent
Li et al.

(10) Patent No.: US 8,341,203 B2
(45) Date of Patent: Dec. 25, 2012

(54) COMPUTER TECHNICAL SOLUTION OF THE DIGITAL ENGINEERING METHOD OF HYBRID NUMERAL CARRY SYSTEM AND CARRY LINE

(76) Inventors: Zhizhong Li, Wuyi County (CN); Juyuan Xu, Wuyi County (CN)

( * ) Notice: Subject to any disclaimer, the term of this patent is extended or adjusted under 35 U.S.C. 154(b) by 1129 days.

(21) Appl. No.: 11/667,211

(22) PCT Filed: Nov. 3, 2005

(86) PCT No.: PCT/CN2005/001838
§ 371 (c)(1),
(2), (4) Date: Sep. 10, 2007

(87) PCT Pub. No.: WO2006/047952
PCT Pub. Date: May 11, 2006

(65) Prior Publication Data
US 2008/0201394 A1    Aug. 21, 2008

(30) Foreign Application Priority Data

Nov. 8, 2004    (CN) ............... 2004 1 0094537
Nov. 8, 2004    (CN) ............... 2004 1 0094538
Nov. 8, 2004    (CN) ............... 2004 1 0094539

(51) Int. Cl.
*G06F 7/00*    (2006.01)

(52) U.S. Cl. ..................................... 708/493

(58) Field of Classification Search .......... 708/200–209, 708/446, 493
See application file for complete search history.

(56) References Cited

U.S. PATENT DOCUMENTS

| | | | |
|---|---|---|---|
| 4,162,480 A * | 7/1979 | Berlekamp | 708/492 |
| 4,866,657 A | 9/1989 | Nishiyama et al. | |
| 4,878,192 A | 10/1989 | Nishiyama et al. | |
| 5,099,237 A * | 3/1992 | Fitingof | 341/59 |
| 6,192,387 B1 | 2/2001 | Taddiken et al. | |
| 6,658,071 B1 * | 12/2003 | Cheng | 708/323 |
| 6,771,197 B1 * | 8/2004 | Yedidia et al. | 341/107 |
| 6,810,007 B1 * | 10/2004 | Kim | 370/208 |
| 6,925,480 B2 | 8/2005 | Duborgel | |

(Continued)

FOREIGN PATENT DOCUMENTS

JP    63-049835    3/1988

(Continued)

OTHER PUBLICATIONS

Knuth, D.E., Chapter I—Positional Notation. In The Art of Computer Programming 4; Seminumerical Algorithms/Arithmetic. Saiensu-sha, Co., Ltd. Publishers, Aug. 25, 1986, pp. 14-17.

*Primary Examiner* — Tan V. Mai
(74) *Attorney, Agent, or Firm* — Connolly Bove Lodge & Hutz LLP

(57) ABSTRACT

The present invention provides a digital engineering method of hybrid numeral carry system and carry line, in which K common Q-ary numerals that participate in the computation of addition and subtraction are transformed into K or 2K numerals of hybrid numeral carry system, then said K or 2K numerals are added for the sum in the hybrid numeral carry system, whereby the operating speed of all kinds of digital engineering can be improved significantly and the error rate of written calculation engineering can be reduced greatly. The present invention also provides a computer technical solution of hybrid numeral carry system and carry line.

5 Claims, 2 Drawing Sheets

U.S. PATENT DOCUMENTS

| | | |
|---|---|---|
| 6,990,626 B2 * | 1/2006 | Ashikhmin .................. 714/794 |
| 7,191,376 B2 * | 3/2007 | Yedidia ........................ 714/751 |
| 2001/0056454 A1 | 12/2001 | Bhushan et al. |
| 2002/0013800 A1 | 1/2002 | Bhushan et al. |
| 2004/0174938 A1 * | 9/2004 | Kim .............................. 375/295 |
| 2004/0267863 A1 | 12/2004 | Bhushan et al. |
| 2005/0138516 A1 * | 6/2005 | Yedidia ........................ 714/746 |
| 2006/0048038 A1 * | 3/2006 | Yedidia et al. ............... 714/793 |

FOREIGN PATENT DOCUMENTS

| | | |
|---|---|---|
| JP | 02-170228 | 7/1990 |
| JP | 02-207323 | 8/1990 |
| JP | 04-363720 | 12/1992 |
| JP | 05-006262 | 1/1993 |
| JP | 07-073018 | 3/1995 |
| JP | 07-319668 | 12/1995 |
| JP | 2000-293360 | 10/2000 |

* cited by examiner

COMPUTER TECHNICAL SOLUTION OF THE DIGITAL ENGINEERING METHOD OF HYBRID NUMERAL CARRY SYSTEM AND CARRY LINE

CROSS-REFERENCE TO RELATED APPLICATIONS

This application is a U.S. National Stage Application of International Application Number PCT/CN2005/001838; filed Nov. 3, 2005, which claims priority to Chinese Patent Application No. 200410094537.5, filed Nov. 8, 2004, Chinese Patent Application No. 200410094538.X, filed Nov. 8, 2004, and Chinese Patent Application No. 200410094539.4, filed Nov. 8, 2004. The content of each of the International Application Number PCT/CN2005/001838, Chinese Patent Application No. 200410094537.5, Chinese Patent Application No. 200410094538.X, and Chinese Patent Application No. 200410094539.4 is expressly incorporated herein by reference in its entirety.

TECHNICAL FIELD

The present invention relates to the digital engineering method and the field of computer, in particular to the arithmetic unit of the computer.

BACKGROUND ART

The "digital engineering" of the present invention specially refers to "digital computation systematic engineering". It relates to the technical solution of realizing the digital engineering of the computation system per se like four arithmetic operations principle. "Numerical calculations that use tools" include written calculation, abacus calculation, mechanical calculation, electrical calculation, and count calculation, etc. in history. Nowadays, only digital electrical calculation, abacus calculation, and written calculation remain, so the corresponding digital calculation systematic engineering includes only three kinds, which are digital computer, abacus, and numerical calculation systematic engineering that uses a pen and paper for written calculation, which is called "written calculation engineering" for short.

The four arithmetic operations in the current digital engineering method, first of all addition, are not quite satisfactory, the major deficiencies are that the speed of computation is slow and in subtraction, the negatives are not brought to their full play, meanwhile, successive subtraction cannot be done. Especially in the combined computations of addition and subtraction, the computations cannot be finished in a single step; in multiplication, the deficiencies of addition expand and become more serious; in division, the above-mentioned deficiencies exist, too. In summary, in the smallest mathematical entity—the rational number entity, the situation of the four arithmetic operations is not satisfactory.

In digital engineering of written calculation, dissection of the computation shows that some implicit computation procedures exist, thus causing some "hidden trouble". Take addition of two numerals as an example, the formula thereof is as formula 1: 123456+345678=469134 [all the numerals in this text whose numerical system are not indicated are common decimal numerals, the same below], wherein the sum at the tens place is 3, and the micro-program operation is as follows in a dissection: ⓐ a carry from the units place; ⓑ the two tens places 5 and 7 are added to the carry of the lower place, i.e., (5+7+1), and the units place of the sum is taken; ⓒ the carry of the sum of (5+7+1) is sent to the higher place, and the rest of the places have the similar situation. Another example is as example 2, wherein three numerals are to be added for the sum, and the formula thereof is as formula 2: 78+297+295=634. It can be seen that the above-mentioned deficiencies are more serious. It is obvious that the following deficiencies exist:

a. It is difficult to mark the carry. If numerals of smaller size are used to indicate the carry, it is liable to cause confusion and the area of the numeral is limited. In particular, the situation is more annoying when 456789 is to be represented, because if the "." is written between the numerals, it is liable to be mixed up with a decimal, and it is inconvenient to represent 456789; if fingers are used to count the numbers, it is slow and inconvenient; if mental calculation is performed, it is a hard mental work and mistakes usually occur.

b. Usually when two numerals are added, there will be three numerals at each place to be added for a sum, so there is the need for a three-layered computation, and when three or more numerals are to be added for a sum, it becomes more inconvenient.

c. It is difficult to check the computations. The computation is usually performed once again, so it is time-consuming and labor-consuming.

Subtraction is more troublesome than addition, and "successive subtraction" within the same vertical formula is impossible, so it must be separated; especially in the combined computations of addition and subtraction, the computation cannot be finished in a single step. In multiplication, this problem is more serious, besides, the formats for the computations of addition, subtraction, multiplication and division are not uniform, and a different format is used for division.

On the other hand, in computer digital engineering, the numerals are usually represented by the common binary numerals, and the negatives are usually represented by the true form, the one's complement, the complement, and the frame shift, etc. In the current computers, computations are all carried out with two numerals, and "multiple computations" cannot be realized. The so-called "multiple computation" means that more than two numerals are added or subtracted at the same time. In the computers that adopt other common numerical systems like the common Q-ary, a lot of corresponding complexities exist [Q is a natural numeral].

Moreover, in digital engineering of abacus, the numerals are usually "combined Q-ary" numerals using common binary and common quinary. Therefore, the pithy formulae for the computations are miscellaneous and there are the corresponding complexities.

SUMMARY OF THE INVENTION

The present invention put forward a new digital engineering method which can remarkably increase the computation speed and can enhance the guarantee for the correctness of the computation. In "written calculation engineering", the error rate of written calculation is greatly reduced. The present invention also provides the computer technical solution that uses the digital engineering method of hybrid numeral carry system and carry line method, in which the computation speed is remarkably increased. The computation uses the hybrid Q-ary or enhanced Q-ary, or partial Q-ary or symmetrical Q-ary in the hybrid numeral carry system. In symmetrical Q-ary, Q is an integer than is greater than 1. They are written as "hybrid/enhanced/partial/symmetrical Q-ary" for short.

According to one aspect of the present invention, a digital engineering method of hybrid numeral carry system and carry line is provided, which uses numerals of "hybrid numeral carry system" and carries out computations by the method of hybrid numeral carry system and carry 2 line". The computation with hybrid numeral carry system could be performed by one of the following solutions: solution 1 (suitable for computer and written calculation engineering): ① the common Q-ary numeral is encoded or otherwise transformed into hybrid carry system numeral; ② hybrid numeral carry system computation ("counterpart scratching", "scratching Q", "accumulating"); ③ numeral of hybrid numeral carry system is decoded or otherwise transformed into common Q-ary numeral; solution 2 (suitable for computer, abacus, or for written calculation engineering, or it may be left un-used): ① common Q-ary numeral is encoded or otherwise transformed into numeral of hybrid numeral carry system; and the numeral of hybrid numeral carry system is encoded into "numeral of encoded all one carry system"; ② "encoded all one carry system" computation ("counterpart scratching", "scratching Q", "accumulating"); ③ "numeral of encoded all one carry system" is decoded into numeral of hybrid numeral carry system; and the numeral of hybrid numeral carry system is decoded or otherwise transformed into common Q-ary numeral; solution 3 (suitable for computer): ① the common Q-ary numeral is encoded or otherwise transformed into numeral of hybrid numeral carry system; and the numeral of hybrid numeral carry system is encoded or otherwise transformed into $\{0, \pm 1\}$ binary numeral (a special case thereof is common binary); ② $\{0, \pm 1\}$ binary computation ("counterpart scratching", "scratching Q", "accumulating"); ③ the $\{0, \pm 1\}$ binary numeral is decoded or otherwise transformed into numeral of hybrid numeral carry system; and the numeral of hybrid numeral carry system is decoded or transformed into common Q-ary numeral; solution 4 (suitable for computer): ① the common Q-ary numeral is encoded or otherwise transformed into numeral of hybrid numeral carry system; and the numeral of hybrid numeral carry system is encoded or transformed into "encoded $\{0, \pm 1\}$ binary numeral"; ② "encoded $\{0, \pm 1\}$ binary" computation ("counterpart scratching", "scratching Q", "accumulating"); ③ the "encoded $\{0, \pm 1\}$ binary numeral" is decoded or otherwise transformed into numeral of hybrid numeral carry system; and the numeral of hybrid numeral carry system is decoded or otherwise transformed into common Q-ary numeral. In the present invention, solutions 1 and 2 are adopted. The "method of hybrid numeral carry system and carry line" includes one of the following three processes.

In the first process, step 1: suppose that K common Q-ary numerals participate in the computations of addition and subtraction, K is an integer and K≧2, and Q is a natural numeral; and these numerals are transformed into K or 2K numerals of hybrid carry system;

step 2: two of the K or 2K numerals are added for sum by using the hybrid numeral carry system; the computation starts from the lowest place, that is, at a certain place, said two numerals are added by place; then the sum of "adding by place" of said two numerals at said place is obtained by "counterpart scratching", "scratching Q", and "accumulating"; said sum is taken into the next computation layer as the "partial sum" numeral; meanwhile, the obtained "hybrid numeral carry" is stored in the next computation layer or at the empty place or zero place of the adjacent higher place of any data line that has not undergone the computation in the present computation layer;

step 3: at the higher place adjacent to said certain place, the computation of step 2 is repeated; this processing is repeated until the highest places of said two numerals have been computed; when parallel computation is adopted, computations in steps 2 and 3 are performed on each place of the two numerals at the same time, then the present step can be skipped; when serial and parallel computation is adopted, the processing is similar;

step 4: another two numerals of the K or 2K numerals are taken to perform the computations in steps 2 and 3; this processing is repeated until all the numerals in the K or 2K numerals or in the computation layer have been taken; when there is only one numeral left, it is directly moved to the next computation layer as the "partial sum" numeral;

step 5: in the next computation layer, the computations for sum as described in the previous steps 2, 3 and 4 are performed on said "sum by place" numeral and the "carry" numeral; this processing is repeated until only one numeral is obtained after the computation in the computation layer; then the number of the sum finally obtained by addition computation with hybrid numeral carry system is just the result of addition and subtraction computations on the K common Q-ary numerals.

Or in the second process:

step 1: suppose that K common Q-ary numerals participate in the computation of addition and subtraction, K is an integer and K≧2, and Q is a natural numeral; and these numerals are transformed into K or 2K hybrid carry method numerals;

step 2: starting from the lowest place, that is, two to K or 2K numerals are taken to be added at the same time at a certain place; "counterpart scratching", "scratching Q" and "accumulating" are adopted; that is, when two numerals are taken, the sum of "adding by place" of said two numerals at said place is obtained and is taken into the next computation layer as the "partial sum" numeral; meanwhile, the obtained "hybrid numeral carry" is stored in the next computation layer or at the empty place or zero place of the adjacent higher place of any data line that has not undergone the computation in the present computation layer;

step 3: another two numerals are taken from the K or 2K numerals to perform the computation of step 2; this processing is repeated until the K or 2K numerals or all the numerals in computation layer have been taken; when there is only one numeral left, it is directly moved to the next computation layer as the "partial sum" numeral;

when each of the numerals at the same place are computed at the same time, the computations of steps 2 and 3 are performed at the same time, then the present step can be skipped; at this time, "counterpart scratching" is first performed on the n numerals whose sum is 0 at the same place; then "scratching Q" is performed on n numerals whose sum is mQ; n is an integer and n≧2, m is an integer; the obtained "hybrid numeral carry" is stored in the next computation layer or at the empty place or zero place of the adjacent higher place of any data line that has not undergone the computation in the present computation layer; at the same place, the rest numerals are "accumulated" or are directly moved to the next computation layer; the accumulation is "multiple (not less than 2) numerals accumulation", when the common "accumulation" of two numerals is adopted, sequential serial accumulation is performed;

step 4: at the higher place adjacent to said certain place, the computations in steps 2 and 3 are repeated, and this processing is repeated until computation has been performed on the highest place of the K or 2K numerals;

step 5: in the next computation layer, the computation for sum as described in the above steps 2, 3 and 4 is performed on said "sum by place" numeral and the "carry" numeral; this processing is repeated until only one numeral is obtained by the computation in the computation layer; then the number of the sum finally obtained by addition computation with hybrid numeral carry system is just the result of addition and subtraction computations on the K common Q-ary numerals.

Or in the third process:

step 1: suppose that K common Q-ary numerals participate in the computation of addition and subtraction, K is an integer and K≧2, and Q is a natural numeral; and these numerals are transformed into K or 2K numerals of hybrid carry system;

step 2: the so-called "two-dimensional computation" is adopted, i.e., computation is performed at each place of the K or 2K numerals at the same time, meanwhile, "counterpart scratching" is performed on the n numerals whose sum is 0 at each place; n is an integer and n≧2;

step 3: the so-called "two-dimensional computation" is adopted, i.e., computation is performed at each place of the K or 2K numerals at the same time, meanwhile, "scratching Q" is performed on n numerals whose sum is mQ at each place; n is an integer and n≧2, m is an integer; the obtained "hybrid numeral carry" is stored at the empty place or zero place of the adjacent higher place of any data line in the next computation layer;

step 4: the so-called "two-dimensional computation" is adopted, i.e., computation is performed at each place of the K or 2K numerals at the same time, meanwhile, the rest of the numerals at each place are "accumulated"; or they are directly moved to the next computation layer; the accumulation is "multiple (not less than 2) numerals accumulation"; when common "accumulation" of two numerals is adopted, sequential serial accumulation is performed;

step 5: in the next computation layer, the computations for sum as described in the above steps 2, 3 and 4 are performed on said "sum by place" numeral and the "carry" numeral; this processing is repeated until only one numeral is obtained by the computation in the computation layer; then the number of the sum finally obtained by addition computation with hybrid numeral carry system is just the result of addition and subtraction computations on the K common Q-ary numerals.

In the digital engineering method of hybrid numeral carry system and carry line, the hybrid numeral carry system is hybrid Q-ary, or enhanced Q-ary, or partial Q-ary or symmetrical Q-ary in the hybrid numeral carry system. In symmetrical Q-ary, Q is a natural number. They are written as "hybrid/enhanced/partial/symmetrical Q-ary" for short. The computation thereof uses the "carry line method", that is, during computation, the generated carry is stored in the "carry line" of the adjacent higher place to be treated as a general computation number, then it is computed together with the "sum by place". Further, the carry is usually put into the next computation layer or into the empty place or zero place of the adjacent higher place of any data line that has not undergone the computation in the present computation layer When the computation for sum is performed for n numerals in K numerals, if, at a certain place, the "sum of adding by place" of n computation numbers is zero, but a carry m (which has the same sign as the sum of the n numerals) is produced; n is an integer and n≧2, m is an integer, the carry is put into the next computation layer or at the empty place or zero place of the adjacent higher place of any data line that has not undergone the computation in the present computation layer; then a certain place of the n computation numbers are set to be "0" in a logical manner so that they will not participate in the subsequent computations, this is called "scratching Q"; in "scratching Q", when m=0, it is called "counterpart scratching"; or "counterpart scratching" and "scratching Q" may not be adopted.

The numeral of hybrid numeral carry system may not be encoded, or it may be encoded by the numeral of hybrid numeral carry system, or it may be also encoded by all one code, which is called all one encoding, that is, each place of numeral S of the respective numerals of the hybrid numeral carry system is corresponded by 1 with the number of |S| arranged from the lowest place to the higher places, and the rest of the higher places are 0, then the total number of places is Q or (Q−1) or Q/2 or (Q+1)/2; meanwhile, the sign of S, i.e., the sign that indicates if the numeral of said place is positive or negative, is used as the sign of each place in the corresponding all one code (see enhanced Q-ary and all one code in part III). When all one code is used to encode numerals of hybrid numeral carry system, the addition of n numerals is only the non-repetitive arrangement of 1 or $\overline{1}$ of the n numerals, which is called "arrangement of 1"; and the encoding and decoding of the all one code could use either fixed code length or variable code length.

Beneficial Effect

The digital engineering method of hybrid numeral carry system and carry line is called hybrid carry method HJF. The "digital engineering" herein specially refers to the "systematic engineering of digital computation" which include only three types at present, i.e. computer, written calculation engineering and abacus. The "hybrid numeral carry system" herein refers to "hybrid Q-ary, enhanced Q-ary, partial Q-ary and symmetrical Q-ary". As far as the numerical system is concerned, the HJF has reached the peak of the field of digital engineering method, which is characterized by the following two aspects:

① The performance of digital engineering is greatly improved. I. The computation speed is greatly increased, the original digital engineering technique uses common Q-ary and performs 'one-layer computation and "one-dimensional computation" by "accumulating", while this digital engineering technique uses hybrid numeral carry system and the hybrid carry method HJF to carry out the computation by "counterpart scratching", "scratching Q" and "accumulating", thus "multi-layered computation" and "multi-dimensional" computation are realized. II. In the original digital engineering technique (computer and abacus), the transformation between the input and output numeral and the common decimal numeral is inconvenient, while in the input and output numeral in this digital engineering technique, when Q=10, it is a decimal numeral which can be conveniently transformed into common decimal numeral. III. The negative numerals cannot be directly represented in the original digital engineering technique, while they can be directly represented in this original digital engineering technique. IV. Subtraction cannot be easily carried out in the original digital engineering technique, while this digital engineering technique does not use subtraction, so the computation becomes easy.

② Prominent features in digital engineering structure. I. Using "counterpart scratching logic" and "Q scratching logic". II. Using "all one encoding". (It may not be used in computer and written calculation engineering.) III. The original computer and written calculation engineering only have "one-layer computation" and "one-dimensional computation" without the structures of "multi-layered computations" and "multi-dimensional computations", while the digital engineering technique of the present computer and written calculation engineering has the structure of "multi-layered computations" and "multi-dimensional computations" (which is also called "structure of hybrid carry method HJF", and "hybrid carry structure" or "HJF structure" for short). IV. The original digital engineering technique does not include the structure of "network computation", while the present computer digital engineering technique includes "register network", "counterpart scratching network" and "Q scratching network" to form a "network structure". V. The original abacus digital engineering uses the structure of "combined carry systems of binary and quinary", while the present abacus digital engineering uses the single structure of "hybrid numeral carry system".

On the other hand, further studies show that this invention has covered all the achievements in numerical system in the field if digital engineering method, and no such improvement can be achieved in the future in the field of digital engineering method.

Hence, the technical solution of digital engineering method of hybrid numeral carry system and carry line that is called "the three Q series of inventions" in general has reached the peak of "digital engineering".

According to another aspect of the present invention, a computer technical solution of the digital engineering method of hybrid numeral carry system and carry line is provided, which performs computation with the "method of hybrid numeral carry system and carry line" and using the numerals of the "hybrid numeral carry system". It comprises an input transformation logic (which can be omitted in the computer of hybrid Q-ary and carry line), an input logic, a CPU, an external storage, an output transformation logic, an output logic and a controller. The control logic and internal memory for hybrid numeral computation form the CPU. Wherein, the K- or 2K-layer arithmetic unit and controller form the control logic for hybrid numeral computation. The numeral of hybrid numeral carry system is input to the K or 2K-layer arithmetic through the shift register input logic; in the K- or 2K-layer arithmetic unit, the numeral of hybrid numeral carry system obtains the result thereof through the K- or 2K-layer computation; then, the encoder output transformation logic outputs it in the form of numeral of hybrid numeral carry system, or common Q-ary numeral, or common decimal numeral through the output logic. The controller coordinates and controls the logics for the entire computation control. The computation of the hybrid numeral carry system can use one of solution 1, solution 2, solution 3 and solution 4, and in the computer of the invention, solution 2 is used for depiction: ① common Q-ary numeral is encoded or otherwise transformed into numeral of hybrid numeral carry system; and the numeral of hybrid numeral carry system is encoded into "all one code"; ② "all one code" computation ("counterpart scratching", "scratching Q", "accumulating"); ③ "all one code" is decoded into numeral of hybrid numeral carry system; and the numeral of hybrid numeral carry system is decoded or otherwise transformed into common Q-ary numeral.

"K- or 2K layer arithmetic unit is composed of accumulator $\Sigma i$, register network, counterpart scratching network and Q-scratching network; i is an ordinal number; when it is used in a computer, especially in the arithmetic unit of computer, the digital engineering method can use either one of the first process, the second process and the third process. The third process is used herein.

step 1: suppose that K common Q-ary numerals participate in the computation of addition and subtraction, K is an integer and $K \geq 2$, and Q is a natural numeral; and these numerals are transformed into K or 2K numerals of hybrid carry system;

step 2: the so-called "two-dimensional computation" is adopted, i.e., computation is performed at each place of the K or 2K numerals at the same time, meanwhile, "counterpart scratching" is performed on the n numerals whose sum is 0 at each place; n is an integer and $n \geq 2$;

step 3: the so-called "two-dimensional computation" is adopted, i.e., computation is performed at each place of the K or 2K numerals at the same time, meanwhile, "scratching Q" is performed on n numerals whose sum is mQ at each place; n is an integer and $n \geq 2$, m is an integer; the obtained "hybrid numeral carry" is stored at the empty place or zero place of the adjacent higher place of any data line in the next computation layer;

step 4: the so-called "two-dimensional computation" is adopted, i.e., computation is performed at each place of the K or 2K numerals at the same time, meanwhile, the rest of the numerals at each place are "accumulated"; or they are directly moved to the next computation layer; the accumulation is "multiple (not less than 2) numerals accumulation"; when common "accumulation" of two numerals is adopted, sequential serial accumulation is performed;

step 5: in the next computation layer, the computations for sum as described in the above steps 2, 3 and 4 are performed on said "sum by place" numeral and the "carry" numeral; this processing is repeated until only one numeral is obtained by the computation in the computation layer; then the number of the sum finally obtained by addition computation with hybrid numeral carry system is just the result of addition and subtraction computations on the K common Q-ary numerals.

In the K- or 2K-layer arithmetic unit, a sign bit is assigned to each register and each bit of the corresponding accumulator $\Sigma i$, said sign bit is a common two-state flip-flop. The K or 2K registers store the input K or 2K numerals of hybrid numeral carry system. "Two-dimensional computation" is adopted in the K- or 2K-layer arithmetic unit, that is, computation is performed at each place of the numeral at the same time, and "counterpart scratching", "scratching Q" and "accumulating" are performed in turn on each place of all the numerals at the same time. When the instruction of the next computation layer arrives, the carry numeral and the "sum by place" numeral are added. This process is repeated until only one numeral is left after computation in the computation layer. Finally, the obtained sum is output by the accumulator $\Sigma i$. If the value of K or 2K is large, a graded and grouped amplification could be performed on said "K- or 2K-layer arithmetic unit".

When the computation for sum is performed for n numerals in K or 2K numerals, if, at a certain place, the "sum by place" of n computation numbers is zero, but a carry m (which has the same sign as the sum of the n numerals) is produced; n is an integer and $n \geq 2$, m is an integer, the carry is put into the next computation layer or at the empty place or zero place of the adjacent higher place of any data line that has not undergone the computation in the present computation layer; then a certain place of the n computation numbers are set to be "0" in a logical manner so that they will not participate in the subsequent computations, this is called "scratching Q"; in "scratching Q", when m=0, it is called "counterpart scratching"; or "counterpart scratching" and "scratching Q" may not be adopted.

In the computer, said numeral for computation is numeral of hybrid numeral carry system, Q is a natural number. It can be encoded by all one code, or by numeral of hybrid numeral carry system, or it may not be encoded. When it is encoded by all one code, that is, each place of numeral S of the respective hybrid numeral carry system is corresponded by 1 with the number of |s| arranged from the lowest place to the higher place, and the rest of the higher places are 0, and the total number of places is Q or (Q−1) or Q/2 or (Q+1)/2; meanwhile, the numeral sign of S, i.e., the sign that indicates if the numeral of said place is positive or negative, is used as the numeral sign of each place in the corresponding all one code. When all one code is used to encode the numeral of hybrid numeral carry system, the addition of n numerals is only the non-repetitive arrangement of 1 or $\overline{1}$ of the n numerals; and the encoding and decoding of the all one code could use either fixed code length or variable code length. The computer of the present invention uses the fixed code length. When encoding by all one code, the accumulator in the K- or 2K-layer arithmetic can be omitted as a all one code shift register which specially stores the sum numeral of the result, so it is called "sum numeral register". If said "two-dimensional computation" is used at this time, it is called "three-dimensional computation", and the corresponding arithmetic unit is called "three-dimensional arithmetic".

The elements used in the computer are P-value elements, P is the radix of the numerical element set, P is an integer and P>1; or the two-value elements or three-value elements are used.

Theoretically, the Q-ary computer in the computer of hybrid numeral carry system and carry line according to the present invention is completely the same as the existing {Q} computer in terms of the external storage and the input and output terminals (including the program).

So far, the specific names, technical indexes, functions, application scopes, design methods and the bottom layer arithmetic logic units, etc. constitute a clear and complete technical solution of the present invention. Thereby, the invention can be determined as valid. As for the work of manufacturing the computer, including the purchase of materials and devices according to the general design of the invention and the market conditions so as to carry out the corresponding logic design, line design, chip design, power supply design, process design, appearance design and experiments test design, etc. they can be realized by those skilled in the art without paying creative effort.

Beneficial Effects (1) In the computer technical solution of hybrid numeral carry system and carry line, the hybrid/enhanced binary computer technical solution has surpassed the existing computer and reached the peak of the field of computer, specifically ①The performance of the computer of hybrid numeral carry system is greatly improved. I. The computation speed is greatly increased, the original computer technique uses common Q-ary and performs "one-layer computation" and "one-dimensional computation" by "accumulating", while the present computer technique uses hybrid numeral carry system and the hybrid carry method HJF to carry out the computation by "counterpart scratching", "scratching Q" and "accumulating", thus "multi-layered computation" and "multi-dimensional" computation are realized. II. In the original digital engineering technique (computer and abacus), the transformation between the input and output numeral and the common decimal numeral is inconvenient, while in the input and output numeral in this digital engineering technique, when Q=10, it is a decimal numeral which can be conveniently transformed into common decimal numeral. III. The negative numerals cannot be directly represented in the original digital engineering technique, while they can be directly represented in this original digital engineering technique. IV. Subtraction cannot be easily carried out in the original digital engineering technique, while this digital engineering technique does not use subtraction, so the computation becomes easy.

According to a rough estimation in general condition, the computation speed of the new generation computer is increased by five times when three-dimensional computation and multiple coefficient K=8 are used. When K increases, the computation speed will be further increased.

②Prominent features of the computer of the hybrid numeral carry system. I. Using "counterpart scratching logic" and "Q scratching logic". II. Using "all one encoding". (It may not be used in computer and written calculation engineering.) III. The original technique only has "one-layer computation" and "one-dimensional computation" without the structures of "multi-layered computations" and "multi-dimensional computations", while the present computer technique has the structure of "multi-layered computations" and "multi-dimensional computations" (which is also called "structure of hybrid carry method HJF", and "hybrid carry structure" or "HJF structure" for short). IV. The original digital engineering technique does not include the structure of "network computation", while the present computer digital engineering technique includes "register network", "counterpart scratching network" and "Q scratching network" to form a "network structure".

③When using "all one encoding" in the computer of hybrid numeral carry system, the arithmetic controller can be realized by the existing two-value elements. Theoretically, the rest of the internal and external storage, input and output devices, console and corresponding programs can be completely the same as those of the existing computer.

(2) As far as the transformation into common decimal numeral is concerned, the hybrid/enhanced/partial decimal computer in the computer technical solution of hybrid numeral carry system and carry line are better than the existing computer. In the original computer, the transformation between the input and output numeral and the common decimal numeral is inconvenient, while in the input and output numeral in the present computer, when Q=10, it is a decimal numeral which can be conveniently transformed into common decimal numeral. Hence the hybrid/enhanced/partial decimal computer has surpassed the existing computer and reached the peak in the field of computer.

(3) As far as the field of "multiple value logic" is concerned, especially when there is a significant breakthrough in the multiple value logic of the "value element set" $Z=\{-1, 0, 1\}$, the hybrid/enhanced/partial decimal computers (even the symmetrical ternary computer) in the computer technical solution of hybrid numeral carry system and carry line are better than the existing computer and they outdistance the existing computer and reach the peak in the field of computer.

(4) As far as the practical, stable and superhighspeed three-value devices (e.g. in quanta computer) that may be used in the future, the hybrid/enhanced/partial decimal computers (even the symmetrical ternary computer) in the computer technical solution of hybrid numeral carry system and carry line are better than the existing computer and they outdistance the existing computer and reach the peak in the field of computer.

In addition, further studies show that this invention has covered all the achievements in numerical system in the field if digital engineering method, and no such improvement can be achieved in the future in the field of digital engineering method.

PREFERRED EMBODIMENTS

Figure 1:
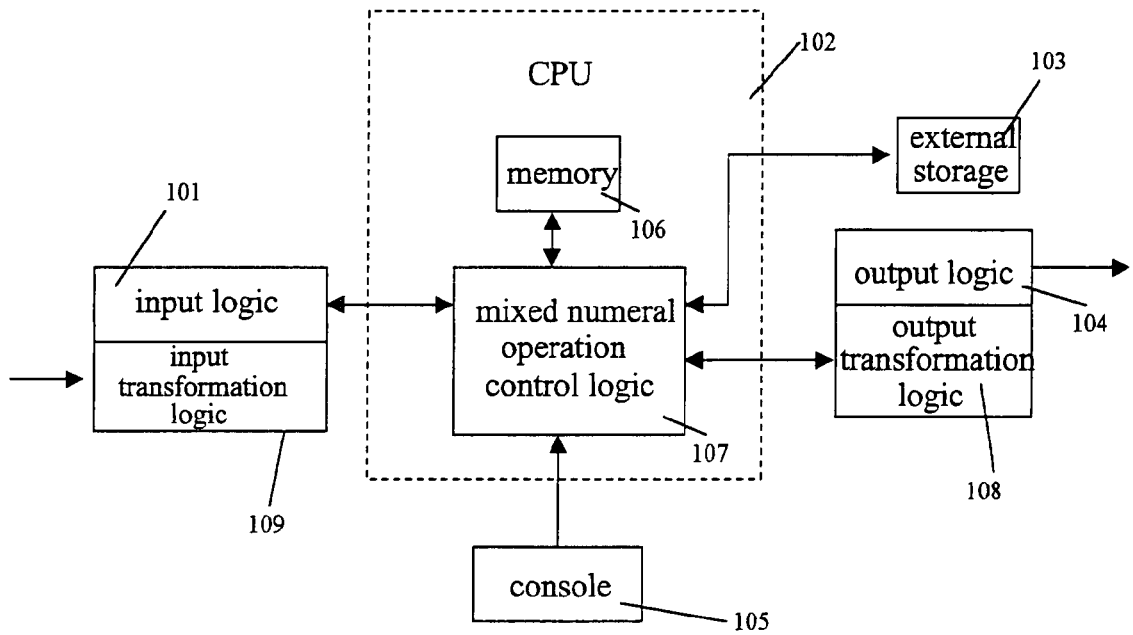
FIG. 1 is the general logic block diagram of the computer using hybrid numeral carry system.

Part I Digital Engineering Method of Hybrid Numeral Carry System and Carry Line 1. <<Method of Carry Line>>
1.1 Carry and <<Method of Carry Line>>

In numeral value computations in computers, one of the keys for increasing the computation speed is "carry". The acquiring and storing of the carry and the participation of the carry in the computation are crucial. "Carry" is competing for "speed". In written calculations, it directly affects the "error rate". This part takes the written calculation engineering as an example to illustrate. The so-called <<Method of carry line>2> is the method that during the computation process, the generated carry is stored in the position that equals to the position of the "sum by place" numeral and that participates in the computation, then it participates in the computation together with the "sum by place". Generally, when two numerals of the same computation layer are added, the carries in different places are arranged in a line which is called the "carry line". (The concept of "computation layer" will be explained in the next section). An example is as follows: suppose that two common decimal numerals are added for sum, and the formula for sum is as formula 3: 123456+345678=469134. The units place computation is (6+8)=14, and the carry 1 thereof is written into the higher place of the next line, and so on. When two numerals are added in the formula, the summing at each place without taking into account the carry is called "adding by place $\oplus$", and the sum thereof is called "sum by place", and the data line of sum by place is called "$\oplus$ line". The $\oplus$ line and the carry line form the "computation layer".

1.2 Analysis of the <<Method of Carry Line>>
1.2.1 Analysis of Adding Two Numerals for the Sum It can be seen from the above section that in the addition computation by means of the <<Method of carry line>2>, ① when two numerals are added, there are only two numerals to be added at each place, and there is no difficulty to directly mark the carry in the carry line; ② it is very convenient to check the computation.

[Lemma 1] when two numerals are added, there is either a carry marked as 1 or no carry marked as 0 at any place;

[Lemma 2] when two numerals are added, the $\oplus$ sum at any place could be one of 0~9, but when there is a carry to the higher place at said place, the $\oplus$ sum at said place can only be one of 0~8, and it cannot be 9.

It can be derived from [Lemma 1] and [Lemma 2] that [Theorem 1] when two numerals are added, the $\oplus$ sum at a certain place can be 9 if and only if said place does not have carry to a higher place.

1.2.2 The Concept of Layer and Computation Layer

Suppose that two numerals are to be added for the sum, and the formula is as formula 4: 5843029+4746979=10590008. It can be seen from formula 4 that the computations are carried out in different layers, and the computation layer decomposes a computation into sub-computations. In each computation layer, the sub-computation is decomposed into micro-computations. The micro-computation only performs one simple computation, and this is the concept of "layer" of computation. The concept of "layer" is a basic concept in mathematics. The <<Method of carry line>2> is just based on said concept. The addition computation methods before also implies the concept of "layer" in substance, so the "layer" in the <<Method of carry line>2> does not increase the complexity of the computation in general. On the contrary, the methods before imply the "layer", so the complexity of computations is increased, which further causes the speed of computations to be slowed down.

1.2.3 The Unique Layer of Computation

When two numerals are added, multiple layers of computation may occur in some special cases, and there are the following relations among the layers.

[Lemma 3] when two numerals are added, if the computation layer prior to some place has a carry, no carry will occur in the following computation layers (deduced from lemma 1 and lemma 2).

[Lemma 4] when two numerals are added, if the computation layer after some place has a carry, it is certain that no carry exists in the previous computation layers (deduced from lemma 1 and lemma 2).

[Theorem 2] when two numerals are added, either none of the computation layers of the same place has carry, or all the computation layers of the same place has only one carry (deduced from lemma 1 and lemma 2).

[Deduction] when two numerals are added, the carry lines of all the layers could be combined into one carry line, and all the computation layers could be combined into one computation layer, except for the 0 computation layer (initial computation formula).

1.2.4 Analysis of Adding Three Numerals or More for the Sum

Suppose that three numerals are added for the sum, and the formula is 231+786+989=2006 (formula 5). Further, suppose that six numerals are added for sum, and the formula is 786+666+575+321+699+999=4046 (formula 6). Keys of operation are as follows:

① The application of "scratching Q". The so-called "scratching Q" is that when n numerals of Q-ary are added at a certain place, the sum of adding by place is zero, but a carry m is generated at said place (which is of the same sign as the sum of said n numerals), n is an integer and n≧2, m is an integer. The carry is put to the next computation layer or to the empty place or zero place of the adjacent higher place of any data line that has not undergone the computation in the present computation layer; meanwhile, said n numerals will no longer participate in the computation at a certain place. That is, when the sum of n numerals at the same place is mQ, the n numerals could all be scratched out, then m is supplemented to the empty place or 0 place of the adjacent higher place. In decimal, Q=10, and scratching Q is just "scratching ten".

② When a plurality of numerals are added, two or more computation layers will occur. In order to reduce the number of computation layers, in the empty place or 0 place of the same computation layer at the same place, the carry and $\oplus$ sum numeral could take any place; the carry from a certain place in an computation layer can be put to the next computation layer or to the empty place or zero place of the adjacent higher place of any data line that has not undergone the computation in the present computation layer.

③ The number of computation layers is reduced as much as possible. a. Smaller numerals are directly combined to be computed; b. carry is performed in "matched pairs" as much as possible; c. the number of numerals to be added in the first computation layer is reduced as much as possible, and the second or higher computation layer is made not to appear as far as possible.

④ At the same place, the numerals are "accumulated" or are directly moved to the next computation layer; the accumulation is "multiple (not less than 2) numerals accumulation", when common "accumulation" of two numerals is adopted, sequential serial accumulation is performed; as for the "identical numerals" and "consecutive numerals", the "partial sum" can be directly obtained.

2. Hybrid Numeral and Hybrid Numeral Carry System

2.1 <<Theory of Numerical System SZLL>>

2.1.1 The system of recording numerals according to the same rule so as to facilitate computations in a numerical system is called "the system of numeral representation system", and "numerical system" for short. The <<Theory of numerical system SZLL>2 > is a science that studies the generation, classification, analysis, comparison, transformation and computation of numerical system. It is also a science that studies the application of numerical system to such branches of mathematics as number theory, group theory, set theory, game theory, etc., and to the neighboring subjects like multiple value logic, Walsh function, <<Model Random Theory MSL of narrow and broad senses>2 >, etc., especially to the computer, written calculation engineering and abacus in digital engineering field. It is one of the fundamental theories of mathematics. The Science of mathematics is the science of numerals. The basis of "numerals" is "numerical system". Therefore, the <<Theory of numerical system SZLL>2 > is the basis for "number theory", and it is one of the "cores" of "core mathematics".

2.1.2 Place Value Numerical System

Suppose that a numeral system is to be constructed, wherein the numerals are represented by "numeral symbols" at different positions. "Numerical symbols" are also called "numerals". All the numerals at each numeral place are assigned with a unit value (also called "place value"). The numerals are usually arranged horizontally from right to left, the values thereof are arranged from low (small) to high (large). The numerical system that represents each numeral in the whole numeral system in this way is called "place value numerical system". The numerical systems we discussed below are all "place value numerical system". They are also called "numerical system" where misunderstanding will not be caused.

2.1.3 Numerical System has Three Factors: Numerical Place I, Numerical Element Set $Z_i$ and Weight $L_i$.

a. numerical place I refers to the position of the numeral of each place in the numerical system. I is an ordinal. When it is an integer, I in each place is represented from right to left, i.e., I=1, 2, 3, . . . indicating the first, second, third . . . place of said numeral.

b. numerical element set $Z_i$ refers to the set formed by the "numeral elements" at the i-th place. In the same numerical system, the collectivity of the numerals of different signs at the same place forms the numerical symbol set, and elements within said numerical symbol set are called "elements of numerals", and "numerical elements" for short. Hence, said numeral symbol set is called "numerical element set Z". The numerical element set $Z_i$ varies or remains the same according to the different values of i. When the $Z_i$ at every place is the same Z, the corresponding numerical system is called "numerical system of single set" or "single numerical system"; when the $Z_i$ of every place are not all same, the corresponding numerical system is called "numerical system of combined set" or "combined numerical system".

The numerical elements in the numerical element set $Z_i$ could be complex number or other various symbols. In the <<Theory of numerical system>2 >, numerical elements are represented by $a_j$ ($a_1, a_2, a_3, \ldots$), j is a natural number and $ia_j$ represents the numerical element aj at the i-th place. It is assumed that when $a_j=-A$ (A is complex number), there is the expression that $a_j=A$. The numerical element set $Z_i$ is represented by the set $\{a_1, \ldots, a_j, \ldots\}$, i.e., $Z_i=\{a_1, \ldots, a_j, \ldots\}$; or literal wordings are used to indicate the characteristics of $Z_i$. For facilitating calculation, the numerical element $a_j$ is chosen to be an integer represented by Arabic numerals.

The radix $P_i$ ($P_i$ is a natural number) of the numerical element set $Z_i$ indicates the total number of the elements in the set. Engels has said that it "decides not only its own nature, but also the nature of all other numerals". The different values of $P_i$ indicate the variation of the numerical element set $Z_i$. If the $P_i$ of all the places are the same P, it is called "single radix"; otherwise, it is called "mixed radix".

In the "place value numerical system" of the (theory of numerical system), the "empty place" in the numeral is defined to represent "null", and the place value thereof is 0, so it is called "empty place 0". "Empty place 0" is one kind of 0 and is one expressing form of 0, so it is an implicit 0 and is usually not indicated. In the numerical element set, "empty place" is a special numerical element, which is called "empty place element" and "empty element" for short. "Empty element" is the numerical element that each "place value numerical system" has, and it's indicated by "empty place" in the numerical element set. It is usually not indicated. "Empty element" is the only numerical element in the numerical element set that is usually not counted in the numerical element $a_j$ and whose number is not counted, i.e., the number thereof is 0. On the other hand, in some special cases, in order to maintain uniform expressions, it is counted into the numerical element and the number thereof is 1.

c. Weight $L_i$ indicates the place value of the i-th place, and said place value is called "weight $L_i$'. $L_i$ is a real number, but for the convenience of calculation, $L_i$ is usually chosen to be an integer, especially a natural number and is expressed by Arabic numeral. Different $L_i$ determine different place values. In the "theory of encoding", the main characteristic of "encoding" lies in weight $L_i$.

The common weight $L_i$ in practice uses the so-called "power weight", i.e., make $L_i=Q_i^{(i-1)}$), $Q_i$ is a real number. For easy calculation, $Q_i$ is generally chosen to be a natural number and could be expressed by Arabic numeral or by the ordinary Chinese numeral. The common $L_i$ of each place is a power weight, and is in the numerical system of the geometric proportion Q. Q is called the "basic number" of numerical system power weight or the "basic number" of the numerical system. Different basic numbers Q determine that the $L_i$ are different, and thereby determining different place values. Q, varies with the change of the values of i, or it may remain the same. When the numerical system power weights $Q_i$ of all the places have the same basic number Q, the corresponding numerical system is called "single Q-ary", which is simplified as "Q-ary" or "carry system". When the numerical system power weights $Q_i$ of all the places do not all have the same basic number, the corresponding numerical system is called "combined Q-ary". Another commonly used weight $L_i$ is "equal weight", that is, the weights L of all the places are the same.

On the basis of the three factors of numerical system as mentioned above, numerical system could have inexhaustible kinds.

2.2 Hybrid Numerals and Hybrid Numeral Carry System

When the numerical element set $Z_i$ includes numerical element 0, said corresponding numerical system is called "0 inclusive numerical system". As for the carry system, it is called "0 inclusive carry system"; when the numerical element set $Z_i$ does not include numerical element 0, said corresponding numerical system is called "0 exclusive numerical system". As for the carry method, it is called "0 exclusive carry system".

When the numerical element set $Z_i$ includes positive numerical elements, negative numerical elements or 0, the corresponding numerical system is called "numerical system of hybrid numeral". With respect to the carry system, it is called "hybrid numeral carry system"; and the numerals in the numerical system of hybrid numeral is called "hybrid numerals". Numerals having both positive numerical elements and negative numerical elements in the hybrid numerals are called "pure hybrid numerals" (numerical element 0 is a neutral numerical element). In the <<Theory of numerical system>2 >, when the positive and negative numerical elements in the numerical element set $Z_i$ are opposite numerals to each other, the corresponding numerical system is called "symmetrical numerical system". With respect to the Q-ary, it is called "symmetrical Q-ary". When the positive and negative numerical elements in the numerical element set are not opposite numerals, the corresponding numerical system is called "asymmetrical numerical system". With respect to the Q-ary, it is called "asymmetrical Q-ary"; when the positive and negative numerical elements in the numerical element set are not all opposite numerals, the corresponding numerical system is called "partial symmetrical numerical system". With respect to the Q-ary, it is called "partial Q-ary".

When all the numerical elements in the numerical element set $Z_i$ are successive integers which form an "integer segment", the corresponding numerical system is called "numerical system of integer segment". As for the carry system, it is called "carry system of integer segment". Engels has said that "0 has richer contents than any other numerals". Since "0" has such special significance, in the <<Theory of numerical system>2 >, when the 0 inclusive integer segment has 0 removed therefrom, it is still a kind of special integer segment.

In any Q-ary numerical system having numerical element set of integer segment, when P=Q, the natural numbers can be expressed in a successive and unique form in said numerical system, which is called "successive numerical system" or "common numerical system". With respect to the Q-ary, it is called "common Q-ary". ("Common Q-ary" herein refers to the asymmetrical "common Q-ary" unless other indicated, the same below.) When P>Q, natural numbers can be expressed successively in said numerical system, but sometimes they can also be expressed in various forms, and this is called "repetitive numerical system or "enhanced numerical system". With respect to the Q-ary, it is called "enhanced Q-ary". When P<Q, natural numbers can only be expressed in a non-successive form, so it is called "intermittent numerical system" or "attenuating numerical system". With respect to the Q-ary, it is called "attenuating Q-ary".

A "system of algebraic numerical system" is established in the <<Theory of numerical system>2 >. The name of a numerical system is "$Z_i$, $L_i$". As for a Q-ary, it is $Z_i Q_i$; as for a single numerical system, it is $ZL_i$; as for a combined Q-ary in the single numerical system, it is $ZQ_i$; as for a Q-ary in the single numerical system, it is $ZQ$. The specific number of Q is represented by ordinary Chinese numerals.

With respect to the 0 inclusive common Q-ary, Z={0, 1, ..., (Q-1)}, so ZQ={0, 1, ..., (Q-1)}Q, Q is an integer and Q>1, and it is called "0 inclusive common Q-ary", which can be represented by the symbol {0 inclusive, Q}. As for the 0 exclusive {1, 2, ..., Q}Q, Q is a natural number, it is called "0 exclusive common Q-ary}, which can be represented by the symbol {0 exclusive, Q}. The 0 inclusive and 0 exclusive common Q-ary go by the general name of "common Q-ary", where Q is a natural number, and it can be represented by the symbol {Q}. Where no misunderstanding would be caused, the "0 inclusive common Q-ary" can also be called "common Q-ary", which is also represented by symbol {Q}. Hence, symbols {two} and {ten} can be used to represent common binary and common decimal.

The hybrid numeral carry system of this document is mainly classified into the following categories:

In enhanced Q-ary", an important one is the 0 inclusive {0, ±1, ... ±(Q-1)}Q-ary, where Q is an integer and Q>1, it is called "0 inclusive hybrid Q-ary", and the symbol thereof is {0 inclusive, Q*}; as for the 0 exclusive {±1, ±2, ... ±Q} Q-ary, where Q is a natural number, it is called "0 exclusive hybrid Q-ary", and the symbol thereof is {0 exclusive, Q*}. The 0 inclusive and 0 exclusive hybrid Q-ary are called "hybrid Q-ary" in general, where Q is a natural number, and the symbol thereof is {Q*}. Where no misunderstanding will be caused, the "0 inclusive hybrid Q-ary" can also be called as "hybrid Q-ary" and represented by the symbol {Q*}. In the <<theory of numerical system>2 >, the name of {ten*} is "single radix number P=19, 0 inclusive, integral segment, symmetrical decimal", which could be written as {nineteen, 0 inclusive, integer segment, symmetric} decimal, or as {0, ±1, ±2, ... ±9} decimal. Usually, it is further represented by {ten*} which is called "hybrid decimal". The name of {two*} is "single radix number P=3, 0 inclusive, integral segment, symmetrical decimal", which could be written as {three, 0 inclusive, integer segment, symmetric} binary, or as {0, ±1} binary. Usually, it is further represented by {two*} which is called "hybrid binary".

In enhanced Q-ary, a very important one is P=Q+1>Q, Q is a natural number, (the "enhanced Q-ary specially refers to this kind in this text unless otherwise indicated, the same below). As for the 0 inclusive {0, ±1, ... ±Q/2}Q-ary, where Q is a positive even number, it is called "0 inclusive enhanced Q-ary" and represented by the symbol {0 inclusive, $Q^\Delta$}; as for the 0 exclusive {±1, ±2, ... ±(Q+1)/2} Q-ary, where Q is a positive odd number, it is called "0 exclusive enhanced Q-ary", and the symbol thereof is {0 exclusive, $Q^\Delta$}. The 0 inclusive and 0 exclusive enhanced Q-ary are called "enhanced Q-ary" in general, where Q is a natural number, and the symbol thereof is {$Q^\Delta$}. Where no misunderstanding will be caused, the "0 inclusive enhanced Q-ary" can also be called as "enhanced Q-ary" and represented by the symbol {$Q^\Delta$}. In the <<theory of numerical system>2 >, the name of {$ten^\Delta$} is "single radix number P=11, 0 inclusive, integral segment, symmetrical decimal", which could be written as {eleven, 0 inclusive, integer segment, symmetric} decimal, or as {0, ±1, ±2, ... ±5} decimal. Usually, it is further represented by symbol {$ten^\Delta$} which is called "enhanced decimal". The name of {$two^\Delta$} is "single radix number P=3, 0 inclusive, integral segment, symmetrical decimal", which could be written as {three, 0 inclusive, integer segment, symmetric} binary, or as {0, ±1} binary. Usually, it is further represented by symbol {$two^\Delta$}, which is called "enhanced binary".

In partial Q-ary among the "common Q-ary", an important case is that the "numerical element set" has only a largest positive numerical element but it does not have the corresponding negative numerical element, and the rest thereof are one of 0 or symmetrical numerical elements, Q is a natural number. In this document, the partial Q-ary refers only to this case. As for the 0 inclusive {0, ±1, ... ±Q/(2-1), ±Q/2}Q-ary, where Q is a positive even number, it is called "0 inclusive partial Q-ary" and represented by the symbol {0 inclusive, Q'}; as for the 0 exclusive {±1, ±2, ..., ±(Q-1)/2, (Q+1)/2} Q-ary, where Q is a positive odd number, it is called "0 exclusive partial Q-ary", and the symbol thereof is {0 exclusive, Q'}. The 0 inclusive and 0 exclusive partial Q-ary are called "partial Q-ary" in general, where Q is a natural number, and the symbol thereof is {Q'}. Where no misunderstanding will be caused, the "0 inclusive partial Q-ary" can also be called as "partial Q-ary" and represented by the symbol {Q'}. Thus symbols {ten'} and {two'} can be used to represent "partial decimal" and "partial binary". In the <<theory of numerical system>2 >, the name of {ten'} is "single radix number P=10, 0 inclusive, integral segment, partial symmetrical decimal", which could be written as {ten, 0 inclusive, integer segment, partial symmetric} decimal, or as {0, ±1, ±2, . . . ±4, 5} decimal. Usually, it is further represented by symbol {ten'} which is called "partial decimal". The name of {two'} is "single radix number P=2, 0 inclusive, integral segment, symmetrical decimal", which could be written as {two, 0 inclusive, integer segment, partial symmetric} binary, or as {0, 1} binary. Usually, it is further represented by symbol {two'}, which is called "partial binary".

In the symmetrical Q-ary among the "common Q-ary", the common symmetrical 0 inclusive $\{0, \pm 1, \ldots, \pm(Q-1)/2\}$Q-ary, Q being an odd number greater than 1, is called "0 inclusive common symmetrical Q-ary", the symbol thereof is {0 inclusive, Q"}. As for the 0 exclusive $\{\pm 1, \ldots, \pm Q/2\}$Q-ary, Q being a positive even number, it is called "0 exclusive common symmetrical Q-ary", and the symbol thereof is {0 exclusive, Q"}. The 0 inclusive and 0 exclusive common symmetrical Q-ary are together called "common symmetrical Q-ary", and "symmetrical Q-ary" for short. Q is an integer that is greater than 1. The symbol thereof is {Q"}. Where no misunderstanding would be caused, the "0 inclusive common symmetrical Q-ary" can also be called "symmetrical Q-ary" which is also represented by the symbol "Q"}.

2.3 Encoding of Hybrid Numerals

The method of encoding with hybrid numerals is called "hybrid numeral encoding".

When A-ary numerical elements are encoded by B-ary numerals, etc., the A-ary numerals are arranged into the corresponding B-ary numerals, etc. by place, which is called "A-ary numeral encoded by B-ary numerals" or "B-encoded A numeral", or "encoded B numeral" or "encoded numeral" for short. For example, {ten} 328={two} 101001000; wherein "encoded {two} numeral" is 0011, 0010, 1000. As mentioned in the above, "encoded $\{0, \pm 1\}$ binary numeral" is the "encoded numeral" encoded by $\{0, \pm 1\}$ binary (the special case thereof is common binary). The computation of "encoded B numeral" is the computation of "encoded B-ary". At this time, A-ary computation is performed between the places of the A-ary numeral, but B-ary computation is performed in each place. When the A-ary numerical element is encoded by B-ary numeral, etc., the maximum places of the required B-ary numerical is called "code length". The fixed "code length" is called "fixed code length". If the highest place 0 is not indicated so as to make it an "empty place 0", the corresponding "code length" is variable, which is called "variable code length".

In the digital engineering method of hybrid numeral carry system and carry line, the computation numeral is the numeral of hybrid numeral carry system, which may not be encoded or may be encoded by general numerals of hybrid numeral carry system; it can also be encoded by all one code, that is, each place of numeral S of the enhanced Q-ary numerals is corresponded by 1 with the number of |S| arranged from the lowest place to the higher places sequentially, and the rest of the higher places are all 0, the total number of places is Q or (Q−1) or Q/2 or (Q+1)/2. Meanwhile, the numeral sign of S, i.e., the sign that indicates if the numeral of said place is positive or negative, is used as the numeral sign of each place in the corresponding all one code. When all one code is used to encode numerals of hybrid numeral carry system, the addition of n numerals is only the non-repetitive arrangement of 1 or $\bar{1}$ of the n numerals, which is called "arrangement of 1"; and the encoding and decoding of the all one code could use either fixed code length or variable code length.

3. Four Arithmetic Operations Using <<Hybrid Carry Method HJF>2 >.

The method that uses hybrid numeral carry system and <<method of carry line>2 > to perform the computations of rational numbers is called <<method of hybrid numeral carry system and carry line>2 >, or <<hybrid carry method HJF>2 > for short.

The method of carrying out computations of rational numbers by using the hybrid Q-ary and <<carry line method>2 > is named as <<method of hybrid Q-ary and carry line>2 >, or as <<hybrid carry method HJF>2 > where misunderstanding would not be caused. Suppose that K common Q-ary numerals participate in the computation of addition and subtraction, K is an integer not less than 2 and Q is a natural number, K is called the multiple coefficient. The positive and negative signs of these common Q-ary numerals are assigned to each place of the corresponding numeral, thus the hybrid Q-ary numerals are formed.

The method of carrying out computations of rational numbers by using the enhanced Q-ary and <<carry line method>2 > is named as <<method of enhanced Q-ary and carry line>2 >, or as <<enhanced carry method ZJF>2 > for short. Suppose that K common Q-ary numerals participate in the computation of addition and subtraction, K is an integer not less than 2 and Q is a natural number, K is called the multiple coefficient. All these numerals are transformed into K or 2K enhanced Q-ary numerals.

(I) Take the transformation of 0 inclusive {Q} to {$Q^A$} as an example:

$\{Q\}=\{0, 1, \ldots, (Q-1)\}Q$, Q is an integer and Q>1  (1)

$\{Q^A\}=\{0, \pm 1, \ldots, \pm Q/2\}Q$. Q is a positive even number  (2)

It can be learned from (1) and (2) that Q is an even number and Q≧2·Q≧2, 2Q≧2+Q, Q≧Q/2+1, ∴(Q−1)≧Q/2

When Q=2, (Q−1)=Q/2; i.e. as far as the absolute value is concerned, the {two} numeral represented by the largest numerical element in {two} equals to the {two} numeral represented by the largest numerical element in {$two^A$}; when Q is an even number that is greater than 2, (Q−1)>Q/2; i.e. as far as the absolute value is concerned, the {Q} numeral represented by the largest numerical element in {Q} is always larger than the {Q} numeral represented by the largest numerical element in {$Q^A$}. At this time, the {Q} numerical element of (Q−1)={$Q^A$} 1$\bar{1}$, that is, if the {Q} numerical element (Q−1) is transformed into the corresponding {$Q^A$} numeral, it is a number of two places 1$\bar{1}$. Wherein the high place is in fact a "carry". It can be seen that if a {Q}numeral is transformed into a {$Q^A$} numeral, when Q=2, it is still a {$Q^A$} numeral; when Q is an even number that is greater than 2, it is the sum of two {$Q^A$} numerals, and one of the {$Q^A$} numeral is the numeral indicated in the "carry line". If K {Q}numerals are transformed into the corresponding {$Q^A$} numerals, when Q=2, they are still K {$Q^A$} numerals; when Q is an even number that is greater than 2, they are the sum of 2K {$Q^A$} numerals.

(II) In the case of 0 exclusive numerals, Q is a positive odd numeral, and the same conclusion is proved to be existing.

(III) If a {Q} numeral has been transformed into a {$Q^A$} numerals, then K {Q} numerals can be transformed into K {$Q^A$} numerals.

In the present invention, 2K enhanced Q-ary numerals are used for depiction.

The method of carrying out computations of rational numbers by using the partial Q-ary and <<carry line method>2 > is named as <<method of hybrid Q-ary and carry line>2 >, or as <<partial carry method PJF>2 >. Suppose that K common Q-ary numerals participate in the computation of addition and subtraction, K is an integer not less than 2 and Q is a natural number. It can be proved by the same reasoning that there is a similar conclusion to that in the enhanced Q-ary. These numerals are transformed into K or 2K partial Q-ary numerals. In the present invention, 2K partial Q-ary numerals are used for depiction.

The method of carrying out computations of rational numbers by using the symmetrical Q-ary and <<carry line method>2 > is named as <<method of symmetrical Q-ary and carry line>2 >, or as <<symmetrical carry method CJF>2 > for short. When it is used in a computing machine, especially in a computer, the <<symmetrical carry method CJF>2 > of the symmetrical ternary {three"} can be adopted. Suppose that K common Q-ary numerals participate in the computation of addition and subtraction, K is an integer not less than 2 and Q is an integer greater than 1 in the symmetrical Q-ary. It can be proved by the same reasoning that there is a similar conclusion to that in the enhanced Q-ary. These numerals are transformed into K or 2K symmetrical Q-ary numerals. In the present invention, 2K symmetrical Q-ary numerals are used for depiction.

The computations of hybrid numeral carry system can use one of the previously mentioned four solutions. In the present invention, the <<hybrid carry method HJF>2 > adopts solution 1 which is depicted by written calculation engineering; and the previously mentioned process one or process two can be adopted. Here, process two is adopted.

3.1 Addition of {ten*}

For example, in the formula $1\bar{2}3+4\bar{5}6=427$, the sum obtained is $5\bar{7}3$. When there is the need to transform it into common decimal {ten} numeral, the sum is 427. Generally speaking, the obtained sum of $5\bar{7}3$ does not need to be transformed (especially when it is used as the intermediate result in the computation process). When there is the need for transformation, the method is as shown in the transformation rules in section 4.1.

3.2 Subtraction of {ten*}

For example, $1\bar{2}3-4\bar{5}6=1\bar{2}3+\bar{4}5\bar{6}=\bar{3}39$ or $112+56-32-85+67-46=72$ 3.3 Multiplication of {ten*}

For example, $2\bar{3}8\times8\bar{9}=1\bar{2}\bar{5}02$ 3.4 Division of {ten*}

For example, $5728\div23=249\ldots1$ 3.5 Addition of {ten$^\Delta$}

For example, $1\bar{2}3+344=43\bar{3}$, the sum obtained is $43\bar{3}$. When there is the need to transform it into common decimal {ten} numeral, the sum is 427. Generally speaking, the obtained sum of $43\bar{3}$ does not need to be transformed (especially when it is used as the intermediate result in the computation process). When there is the need for transformation, the method is as shown in the transformation rules in section 4.1.

3.6 Subtraction of {ten$^\Delta$}

For example, $1\bar{2}3-344=1\bar{2}3+\bar{3}\bar{4}\bar{4}=\bar{3}4\bar{1}$; or $112+1\bar{4}\bar{4}-32-1\bar{2}5+1\bar{3}3-5\bar{4}=1\bar{3}2$ 3.7 Multiplication of {ten$^\Delta$}

For example, $2\bar{4}2\times1\bar{3}1=11502$ 3.8 Division of {ten$^\Delta$}

For example, $1\bar{4}33\bar{2}\div23=25\bar{1}\ldots1$ 3.9 Addition of {ten'}

For example, $1\bar{2}3+344=43\bar{3}$, the sum obtained is $43\bar{3}$. When there is the need to transform it into common decimal {ten} numeral, the sum is 427. Generally speaking, the obtained sum of $43\bar{3}$ does not need to be transformed (especially when it is used as the intermediate result in the computation process). When there is the need for transformation, the method is as shown in the transformation rules in section 4.1.

3.10 Subtraction of {ten'}

For example, $1\bar{2}3-344=1\bar{2}3+\bar{3}\bar{4}\bar{4}=\bar{3}4\bar{1}$; or for example $112+1\bar{4}\bar{4}-32-1\bar{2}5+1\bar{3}3-5\bar{4}=1\bar{3}2$ 3.11 Multiplication of {ten'}

For example, $2\bar{4}2\times1\bar{3}1=11502$ 3.12 Division of {ten'}

For example, $1\bar{4}33\bar{2}\div23=25\bar{1}\ldots1$ 3.13 Addition of {three"}

For example, $10\bar{1}1+1\bar{1}00=1\bar{1}\bar{1}\bar{1}1$, the sum is $1\bar{1}\bar{1}\bar{1}1$. When there is the need to transform it into common decimal {ten} numeral, the sum is 437. Generally speaking, the obtained sum of $1\bar{1}\bar{1}\bar{1}1$ does not need to be transformed (especially when it is used as the intermediate result in the computation process). When there is the need for transformation, the method is as shown in the transformation rules in section 4.1.

3.14 Subtraction of {three"}

For example, $10\bar{1}1-1\bar{1}00=01\bar{1}1$ 3.15 Multiplication of {three"}

For example, $10\bar{1}1\times1\bar{1}00=1\bar{1}0\bar{1}\bar{1}00$ 3.16 Division of {three"}

For example, {ten} $25\div18=1\ldots7$ 3.17 Characteristics of Four Arithmetic Operations ① Addition and subtraction are combined into addition. First, subtraction is transformed into addition for computation, so in real computation, the addition and subtraction are combined into addition, which eliminated the difficulty of successive addition and subtraction, and this is determined by the characteristics of hybrid numerals. Thus the technique of "reduction of hybrid numerals" is brought into being. It means that when n numerals at the same place are added for the sum, if the sum is 0, these n numerals can be cancelled. The "reduction of hybrid numerals" can also be called "counterpart canceling" or "counterpart scratching". That is, during "scratching Q" as mentioned previously, when m=0, it is called "counterpart scratching". In the formula, said n numerals at said place can be scratched out by backlashes and will not participate in the subsequent computation. In real computation, the result of the hybrid numerals is obtained by repetitively performing "counterpart scratching", "scratching Q", and "accumulating".

② The methods for multiplication and division are simple. Thanks to the use of hybrid numerals, the "subtracting" process in the division can be changed into the "adding" process. In order to get rid of the concept of "subtraction", the sign of the divident can be reversed, then the whole process "subtraction" is completely changed into a process of "addition", and this may further reduce the complexity of the whole computation. From now on, we use this method to perform division. But it should be noted that if arithmetical compliment appears at this time, the sign thereof should be reversed to obtain the arithmetical compliment of the final result of computation.

Meanwhile, the process of trying the quotients in division can be changed into the predefined iterative process.

③ The speed for addition, subtraction, multiplication and division in the four arithmetic operations can be remarkably increased.

④ Guarantee for the correctness of the computation is enhanced, and in the "written calculation engineering", the error rate of written calculation is greatly reduced.

4. The Relationship Between Hybrid Decimal {ten*} and Common Decimal {ten}

4.1 The Method for Transformation Between the Numerals of {ten*} and {ten}

Integers are referred to herein, for example, {ten*} $3\overline{82}2\overline{96}$={ten} 221716. {ten} numeral per se is a special case of {ten*} numeral, so {ten} numeral is just {ten*} numeral without any transformation, and only the positive and negative signs of these common Q-ary numerals are to be assigned to each place of these corresponding numerals.

There are several methods for transforming {ten*} numerals into {ten} numerals. One is to change the {ten*} numeral into a positive {ten} numeral and a negative {ten} numeral and add them for the sum. There are many ways of doing this, wherein the typical one is to take the positive numeral places and the 0 place in said {ten*} numeral as a positive {ten} numeral, while take the negative numeral places as a negative {ten} numeral. For example, {ten*}$3\overline{82}2\overline{96}$={ten} 302006−80290=221716. Another is to make the positive numeral at each place of said numeral unchanged, and make the negative numeral to become the "complement" of its absolute value for 10, meanwhile, the adjacent higher place is subtracted by 1 (i.e., added by $\overline{1}$). A further method is that in each place of said numeral, the numeral segment of successive positive numerals (or 0) are written as it is, for example, 3×2××6. However, when it is not at the end (the place of units) of the {ten*} numeral, the lowest place is added by $\overline{1}$; as for numeral segment of successive negative numerals, the negative numeral is changed into the "complement" of its absolute value for 9, e.g., ×1×70×, then the lowest place thereof is added by 1. In this way, the result is obtained to be 221716, which is the corresponding {ten} numeral.

When the first place of said {ten*} numeral to be transformed is negative, that is, said numeral is a negative numeral, the reverse numeral of said numeral is transformed into {ten} numeral, then the sign of said {ten} numeral is taken to be negative.

4.2 Comparison Table of {ten*} and {ten} and the Explanations (See Table 1)

① In the table 1, $0_+$ and $0_-$ are respectively 0 obtained by approaching 0 from the positive and negative directions.

② In the table 1, $\dot{9}$ is the abbreviation of the whole of "consecutive, non-negative, integral number of 9", i.e., $\dot{9}$ could be zero 9, one 9, or it could be 99, or 999, . . . . The aggregation expressed in such a form is called "continuous aggregation", which is obviously an infinite aggregation. Assume that E is an integer, then $\dot{E}$ is the "continuous aggregation" of E, which is called as "continuous E" and read as "E dot". A group of endless numerals represented by the "continuous aggregation" is called "continuous array" or "group numerals of continuous aggregation".

③ It can be learned from the two forms of expression of 10 that $\overline{0}=0=\dot{0}=\dot{\overline{0}}$.

④ In the system of {ten*} numerals, there are only four forms of "continuous aggregation", i.e., ($\dot{0}$, $\dot{\overline{0}}$ $\dot{9}$, $\dot{\overline{9}}$). Since $\dot{0}=\dot{\overline{0}}$, there are only three forms of "continuous aggregation", i.e., ($\dot{0}$, $\dot{9}$, $\dot{\overline{9}}$), which can also be written as ($\dot{0}$, ±$\dot{9}$).

TABLE 1

| | |
|---|---|
| $0 = 00 = 000 = \ldots = \dot{0} = 0_+$ | $\overline{0} = \overline{00} = \overline{000} = \ldots = \dot{\overline{0}} = 0_-$ |
| $1 = 1\overline{9} = 1\overline{99} = \ldots = 1\dot{\overline{9}}$ | $\overline{1} = \overline{1}9 = \overline{1}99 = \ldots = \overline{1}\dot{9}$ |
| $2 = 1\overline{8} = 1\overline{98} = \ldots = 1\dot{\overline{9}}8$ | $\overline{2} = \overline{1}8 = \overline{1}98 = \ldots = \overline{1}\dot{9}8$ |
| $3 = 17 = 1\overline{97} = \ldots = 1\dot{\overline{9}}7$ | $\overline{3} = \overline{1}7 = \overline{1}97 = \ldots = \overline{1}\dot{9}7$ |

TABLE 1-continued

| | |
|---|---|
| $4 = 1\overline{6} = 1\overline{96} = \ldots = 1\dot{\overline{9}}6$ | $\overline{4} = \overline{1}6 = \overline{1}96 = \ldots = \overline{1}\dot{9}6$ |
| $5 = 1\overline{5} = 1\overline{95} = \ldots = 1\dot{\overline{9}}5$ | $\overline{5} = \overline{1}5 = \overline{1}95 = \ldots = \overline{1}\dot{9}5$ |
| $6 = 1\overline{4} = 1\overline{94} = \ldots = 1\dot{\overline{9}}4$ | $\overline{6} = \overline{1}4 = \overline{1}94 = \ldots = \overline{1}\dot{9}4$ |
| $7 = 1\overline{3} = 1\overline{93} = \ldots = 1\dot{\overline{9}}3$ | $\overline{7} = \overline{1}3 = \overline{1}93 = \ldots = \overline{1}\dot{9}3$ |
| $8 = 1\overline{2} = 1\overline{92} = \ldots = 1\dot{\overline{9}}2$ | $\overline{8} = \overline{1}2 = \overline{1}92 = \ldots = \overline{1}\dot{9}2$ |
| $9 = 1\overline{1} = 1\overline{91} = \ldots = 1\dot{\overline{9}}1$ | $\overline{9} = \overline{1}1 = \overline{1}91 = \ldots = \overline{1}\dot{9}1$ |
| $10 = \begin{cases} 1\overline{0} = 1\overline{90} = \ldots = 1\dot{\overline{9}}0 \\ 10 = 1\overline{90} = \ldots = 1\dot{\overline{9}}0 \end{cases}$ | $\overline{10} = \begin{cases} \overline{1}0 = \overline{1}90 = \ldots = \overline{1}\dot{9}0 \\ \overline{10} = \overline{1}9\overline{0} = \ldots = \overline{1}\dot{9}\overline{0} \end{cases}$ |
| $11 = 11 = 1\overline{9}1 = \ldots = 1\dot{\overline{9}}1$ | $\overline{11} = \overline{11} = \overline{1}9\overline{1} = \ldots = \overline{1}\dot{9}\overline{1}$ |
| ⋮ | ⋮ |

4.3 Analysis of the Relationship Between {ten*} and {ten}

{ten} numeral is part of {ten*} numeral, and the {ten} numeral set is the proper subset of {ten*} numeral set; {ten*} numeral ⊃ {ten} numeral, that is, {ten*} numeral has proper inclusion relationship for {ten} numeral. The relationship between the {ten} numeral and the {ten*} numeral is "one to many correspondence" instead of "one to one correspondence". Because of this, {ten*} has the flexibility of diversified processing, and this explains for the diversity and rapidity of {ten*} computation. From this point of view, {ten*} has more powerful functions.

In {ten}, P=Q, so in said numerical system, natural numerals are expressed in the unique and successive form, so there is no diversity and thus lacking the corresponding flexibility. In {ten*}, P>Q, so in said numerical system, the natural numerals sometimes manifest themselves in many forms, and this is the reason why said numerical system is flexible. It makes the computation simple and fast. It is also justifiable to say that {ten*} sacrifices diversity for flexibility. Only under the existence of {ten*}, can the <<hybrid carry method HJF>2>> and the new technical solution of "written calculation engineering" come into existence, and only under the existence of {ten*}, can the processor and the corresponding new technical solution of computer come into existence.

When {ten*} numeral is transformed into {ten} numeral, it can only be transformed into an unique corresponding numeral, this is because that {ten*} numeral can be directly obtained by adding and subtracting of {ten} numeral, while the result of the addition and subtraction computations of {ten} numeral is unique. Contrarily, {ten} numeral can only be transformed into the unique corresponding "group numerals of continuous aggregation" for a set of {ten*}. Therefore, the relationship between the "one" of {ten} numeral and the "one" group of the "group numerals of continuous aggregation" for {ten*} is "one to one correspondence". Thereby, the relationship that the {ten} numeral and the {ten} numeral are mapping to each other is established. Since the transformation is a correspondence of the set to itself, {ten} numeral and {ten*} numeral are "one to one transformation". As for the computation system, {ten} and {ten*} numeral systems are "automorphic". All the computational characters corresponding to the {ten} numeral are also valid in the {ten*} numeral system.

It shall be pointed out that of course the above analysis for the {ten} and {ten*} numerals is completely corresponding to the analysis for the {Q} and {Q*}, because {ten} and {Q} are isomorphic. Therefore, ① {Q} numeral is part of {Q*} numeral, and {Q} numeral set is a proper subset of {Q*} numeral set; {Q*} numeral ⊃ {Q} numeral, i.e., {Q*} numeral has proper inclusion relationship for the {Q} numeral. ② The relationship between the {Q} numeral and {Q*} numeral is "one to many correspondence" instead of "one to one correspondence". ③ Meanwhile, the relationship between "one" numeral in {Q} and "one" group of the "group numerals of continuous aggregation" in {Q*} is "one to one correspondence". ④ {Q} and {Q*} numeral systems are "automorphic". All the computational characters corresponding to the {Q} numeral system are also valid in the {Q*} numeral system.

The following sections describe the enhanced Q-ary

4. The Relationship Between the Enhanced Decimal {ten$^\Delta$} and the Common Decimal {ten}

4.1 Method of Transformation Between {ten$^\Delta$} Numeral and {ten} Numeral Integers are referred to herein, for example, {ten$^\Delta$}222$\overline{3}$2$\overline{4}$={ten} 221716. The {ten} numeral shall be transformed into {ten$^\Delta$} numeral by means of table 1. There are several methods for transforming {ten$^\Delta$} numeral into {ten} numeral. One is to change the {ten$^\Delta$} numeral into a positive {ten} numeral and a negative {ten} numeral and add them for the sum. There are many ways of doing this, wherein the typical one is to take the positive numeral places and the 0 place in said {ten$^\Delta$} numeral as a positive {ten} numeral, while take the negative numeral places as a negative {ten} numeral. For example, {ten$^\Delta$} 222$\overline{3}$2$\overline{4}$={ten} 222020−304=221716. Another is to make the positive numeral at each place of said numeral unchanged, and make the negative numeral to become the "complement" of its absolute value for 10, meanwhile, the adjacent higher place is subtracted by 1 (i.e., added by $\overline{1}$). A further method is that in each place of said numeral, the numeral segment of successive positive numerals (or 0) are written as it is, for example, 222×2×. However, when it is not at the end (the place of units) of the {ten$^\Delta$}numeral, the lowest place is added by $\overline{1}$; as for numeral segment of successive negative numerals, the negative numeral is changed into the "complement" of its absolute value for 9, e.g., ×××6×5, then the lowest place thereof is added by 1. In this way, the result is obtained to be 221716, which is the corresponding {ten} numeral.

When the first place of said {ten$^\Delta$} numeral to be transformed is negative, that is, said numeral is a negative numeral, the reverse numeral of said numeral is transformed into {ten} numeral, then the sign of said {ten} numeral is taken to be negative.

4.2 The Comparison Table of {ten$^\Delta$} and {ten} and the Explanations (Table 1)

③ In fact, the set of numerical elements of {ten$^\Delta$} includes both $\overline{5}$ and $\overline{1}5$, so the corresponding repetitive numerals occur. In other words, if $\overline{5}$ or $\overline{1}5$ is removed from the set of numerical elements of {ten$^\Delta$}, there will be no repetitive numeral. And such numerical system without repetitive numeral is called a partial Q-ary {Q'}, where Q=10.

4.3 Analysis of the Relationship Between {ten$^\Delta$} and {ten}

The relationship between the {ten} numeral and the {ten$^\Delta$} numeral is a partial "one to many correspondence" relationship instead of a "one to one correspondence" relationship, so the partial diversity of {ten$^\Delta$} results in the flexibility in part of the processing, and this explains for the partial rapidity in the computation of {ten$^\Delta$}. From this point of view, {ten$^\Delta$} has more powerful functions. When {ten$^\Delta$} numeral is transformed into {ten} numeral, it can only be transformed into an unique corresponding numeral, this is because that {ten$^\Delta$} numeral can be directly obtained by adding and subtracting of {ten} numeral, while the result of the addition and subtraction computations of {ten} numeral is unique. Contrarily, {ten} numeral can only be transformed into the unique corresponding group of {ten$^\Delta$} numerals. Therefore, the relationship between the "one" of {ten} numeral and the "one" group of {ten$^\Delta$}numerals is "one to one correspondence". Thereby, the relationship that the {ten$^\Delta$}numeral and the {ten} numeral are mapping to each other is established. As for the computation system, {ten} and {ten$^\Delta$} numeral systems are "isomorphic". All the computational characters corresponding to the {ten} numeral are also valid in the {ten$^\Delta$} numeral system.

In {ten$^\Delta$}, P>Q, so in said numerical system, the natural numerals sometimes manifest themselves in many forms, and this is the reason why said numerical system is flexible. It makes the computation simple and fast. It is also justifiable to say that {ten$^\Delta$} sacrifices partial diversity for partial flexibility. In {ten}, P=Q, and the natural numbers are expressed in a successive and unique form, so it does not have such diversity and thus lacking the corresponding flexibility.

It shall be pointed out that of course the above analysis for the {ten} and {ten$^\Delta$} numerals is completely corresponding to the analysis for the {Q} and {Q$^\Delta$}, because {ten} and {Q} are isomorphic. Therefore, ① the relationship between the {Q} numeral and the {Q$^\Delta$} numeral is partial "one to many correspondence" instead of "one to one correspondence". ② The relationship between "one" numeral in {Q} and a group of numerals in {Q$^\Delta$} numeral is "one to one correspondence". ③ {Q} and {Q$^\Delta$} numeral systems are "isomorphic". All the computational characters corresponding to the {Q} numeral system are also valid in the {Q$^\Delta$} numeral system.

The following section describes the partial Q-ary

| ... | $\overline{1}0$ | $\overline{9}$ | $\overline{8}$ | $\overline{7}$ | $\overline{6}$ | $\overline{5}$ | $\overline{4}$ | $\overline{3}$ | $\overline{2}$ | $\overline{1}$ | 0 | 1 | 2 | 3 | 4 | 5 | 6 | 7 | 8 | 9 | 10 | ... | {+} |
|---|---|---|---|---|---|---|---|---|---|---|---|---|---|---|---|---|---|---|---|---|---|---|---|
| ... | $\overline{1}0$ | $\overline{1}1$ | $\overline{1}2$ | $\overline{1}3$ | $\overline{1}4$ | $\overline{5}$ / $\overline{1}5$ | $\overline{4}$ | $\overline{3}$ | $\overline{2}$ | $\overline{1}$ | 0 | 1 | 2 | 3 | 4 | 5 / $1\overline{5}$ | $1\overline{4}$ | $1\overline{3}$ | $1\overline{2}$ | $1\overline{1}$ | $1\overline{0}$ | ... | {+$^\Delta$} |

Table 1 the comparison table between numerals of {ten$^\Delta$} and {ten}

① The {ten$^\Delta$} numerals corresponding to {ten} numerals may or may not include repetitive numerals.

② When numeral 5 (positive or negative) appears in {ten$^\Delta$} numerals, there is repetitive {ten$^\Delta$} numeral in the corresponding {ten} numeral. At this time, there may or may not be numeral 5 in the corresponding {ten} numeral. As for the repetitive numeral of {ten$^\Delta$} numeral to {ten} numeral, 5=1$\overline{5}$ and $\overline{5}$=$\overline{1}$5 are the "main repetitions" and the rest of the repetitive numerals can be deduced therefrom.

4. The Relationship Between the Partial Decimal {ten'} and the Common Decimal {ten}

4.1 Method of Transformation Between {ten'} and {ten} Numeral

Integers are referred to herein, for example, {ten'}222$\overline{3}$2$\overline{4}$={ten} 221716. The {ten} numeral shall be transformed into {ten'} numeral by means of table 1. There are several methods for transforming {ten'} numeral into {ten} numeral. One is to change the {ten'} numeral into a positive {ten} numeral and a negative {ten} numeral and add them for the sum. There are many ways of doing this, wherein the typical one is to take the positive numeral places and the 0 place in said {ten'} numeral as a positive {ten} numeral, while take the negative numeral places as a negative {ten} numeral. For example, {ten'} 222 $32\bar{4}$={ten} 222020-304=221716. Another is to make the positive numeral at each place of said numeral unchanged, and make the negative numeral to become the "complement" of its absolute value for 10, meanwhile, the adjacent higher place is subtracted by 1 (i.e., added by $\bar{1}$). A further method is that in each place of said numeral, the numeral segment of successive positive numerals (or 0) are written as it is, for example, 222×2×. However, when it is not at the end (the place of units) of the {ten'} numeral, the lowest place is added by $\bar{1}$; as for numeral segment of successive negative numerals, the negative numeral is changed into the "complement" of its absolute value for 9, e.g., ×××6×5, then the lowest place thereof is added by 1. In this way, the result is obtained to be 221716, which is the corresponding {ten} numeral.

When the first place of said {ten'} numeral to be transformed is negative, that is, said numeral is a negative numeral, the reverse numeral of said numeral is transformed into {ten} numeral, then the sign of said {ten} numeral is taken to be negative.

4.2 The Comparison Table of {ten'} and {ten} and the Explanations (Table 1)

Note: the numerical system with no repetitive numerals as shown in table 1 is called the partial Q-ary {Q'}, where Q=10.

4.3 Analysis of the Relationship Between {ten'} and {ten}

| ... | $\bar{10}$ | $\bar{9}$ | $\bar{8}$ | $\bar{7}$ | $\bar{6}$ | $\bar{5}$ | $\bar{4}$ | $\bar{3}$ | $\bar{2}$ | $\bar{1}$ | 0 | 1 | 2 | 3 | 4 | 5 | 6 | 7 | 8 | 9 | 10 | ... | {+} |
| --- | --- | --- | --- | --- | --- | --- | --- | --- | --- | --- | --- | --- | --- | --- | --- | --- | --- | --- | --- | --- | --- | --- | --- |
| ... | $\bar{1}0$ | $\bar{1}1$ | $\bar{1}2$ | $\bar{1}3$ | $\bar{1}4$ | $\bar{1}5$ | $\bar{4}$ | $\bar{3}$ | $\bar{2}$ | $\bar{1}$ | 0 | 1 | 2 | 3 | 4 | 5 | $1\bar{4}$ | $1\bar{3}$ | $1\bar{2}$ | $1\bar{1}$ | $1\bar{0}$ | ... | {+'} |

Table 1 the comparison table between numerals of {ten'} and {ten}

The relationship between the {ten'} numeral and the {ten} numeral is "one to one correspondence". When {ten'} numeral is transformed into {ten} numeral, it can only be transformed into an unique corresponding numeral, this is because that {ten'} numeral can be directly obtained by adding and subtracting of {ten} numeral, while the result of the addition and subtraction computations of {ten} numeral is unique. Contrarily, {ten} numeral can only be transformed into an unique {ten'} numeral. Therefore, the relationship of mapping between the {ten'} numeral and the {ten} numeral is established. As for the computation system, {ten} and {ten'} numeral systems are "isomorphic". All the basic computational characters corresponding to the {ten} numeral are also valid in the {ten'} numeral system. In P=Q, so in said numerical system, natural numerals are expressed in the unique and successive form, so there is no diversity and thus lacking the corresponding flexibility.

It shall be pointed out that of course the above analysis for the {ten} and {ten'} numerals is completely corresponding to the analysis for the {Q} and {Q'}, because {ten} and {Q} are isomorphic. Therefore, ① the relationship between the {Q} numeral and the {Q'} numeral is "one to one correspondence". ② {Q} and {Q'} numeral systems are "isomorphic". All the basic computational characters corresponding to the {Q} numeral system are also valid in the {Q'} numeral system.

The following section describes the symmetrical Q-ary

4. The Relationship Between the Symmetrical Ternary {three"} and the Common Decimal {ten}.

4.1 Method of Transformation Between {three"} and {ten}

Integers are referred to herein. First, {ten} numeral is transformed into {Q} numeral. When Q=3, {ten} numeral is transformed into {three} numeral. For example, {ten} 25={three} 221.

| ... | $\bar{6}$ | $\bar{5}$ | $\bar{4}$ | $\bar{3}$ | $\bar{2}$ | $\bar{1}$ | 0 | 1 | 2 | 3 | 4 | 5 | 6 | ... | {+} |
| --- | --- | --- | --- | --- | --- | --- | --- | --- | --- | --- | --- | --- | --- | --- | --- |
|  | $\bar{20}$ | $\bar{12}$ | $\bar{11}$ | $\bar{10}$ | $\bar{2}$ | $\bar{1}$ | 0 | 1 | 2 | 10 | 11 | 12 | 20 |  | {≡} |
|  | $\bar{1}10$ | $\bar{1}11$ | $\bar{1}\bar{1}$ | $\bar{1}0$ | $\bar{1}1$ | $\bar{1}$ | 0 | 1 | $1\bar{1}$ | 10 | 11 | $1\bar{1}\bar{1}$ | $1\bar{1}0$ |  | {≡"} |

Table 1 Comparison table of {ten}, {three} and {three"}

The method of transformation is successively dividing the {ten} numeral by Q until the quotient is zero. Thus an arithmetic complement appears in each time. The arithmetic complements are listed starting from the last place of arithmetic complement in the order from low to high in the direction as shown by the arrow, then the numeral obtained is the resulted {Q} numeral. Next, the {Q} numeral is transformed into {Q"} numeral. When Q=3, the {three} numeral is encoded and transformed into {three"} numeral according to table 1, then the {three"} numeral is transformed into {ten} numeral. For example, {three"}$10\bar{1}1$={ten} 25. First, the {Q"} numeral is transformed into {q} numeral. When Q=3, {three"} numeral is transformed into {three} numeral. For example, {three} $10\bar{1}1$={three} 211. This can be obtained from table 1. Then, the {Q} numeral is transformed into {ten} numeral, and this can be obtained by multiplying each place of the {Q} numeral by the weight value of said place and then computing the sum. When Q=3, {three"} numeral is transformed into {three} numeral and is then transformed into {ten} numeral. {three"} $10\bar{1}1$={three} 221={ten} 25. Or, the {Q"} numeral is directly transformed into {ten} numeral, that is, each place of the {Q"} numeral is multiplied by the weight value on said place and then the sum is computed. When Q=3, {three"} numeral is directly transformed into {ten} numeral.

When the first place of the {three"} numeral to be transformed is negative, that is, said numeral is a negative numeral, the reverse numeral of said numeral is transformed into {ten} numeral, then the sign of said {ten} numeral is taken to be negative.

4.2 Analysis of the Relationship Between {three"} and {ten}

In {three"}, P=Q, so in said numerical system, natural numerals are expressed in successive and unique form. It has no diversity, thus it lacks the corresponding flexibility. The relationship between the {three"} numeral and the {ten} numeral is "one to one correspondence". Therefore, the relationship of mapping between the {three"} numeral and the {ten} numeral is established. As for the computation system, {ten} and {three"} numeral systems are "isomorphic". All the basic computational characters corresponding to the {ten} numeral are also valid in the {three"} numeral system. In addition, the {ten} numeral system and the {Q} numeral system are isomorphic, so the {three} and {three"} numeral systems are isomorphic.

It shall be pointed out that of course the above analysis for the {ten} and {ten'} numerals is completely corresponding to the analysis for the {Q} and {Q'}. Therefore, ① the relationship between the {Q} numeral and the {Q"} numeral is "one to one correspondence". ② {Q} and {Q'} numeral systems are "isomorphic". All the basic computational characters corresponding to the {Q} numeral system are also valid in the {Q"} numeral system.

The above sections describe the situations of hybrid Q-ary, enhanced Q-ary, partial Q-ary and symmetrical Q-ary.

5. Conclusion

The application of aforesaid "mathematic method of a hybrid numeral carry system and carry line" into the general design in the art of "digital engineering" results in "digital engineering method of a hybrid numeral carry system and carry line" (the art of "digital engineering" comprises and only comprises three basic types: computer, written engineering and abacus). The part of Summary of the Invention of the specification and the claims have given detailed description of the "digital engineering method of a hybrid numeral carry system and carry line"

In digital engineering, the digital engineering method of hybrid numeral carry system and carry line could notably increase the computation speed, and greatly reduce the error rate of written calculation. It is just the application of the "engineering technique of direct application" of the third hierarchy of mathematics as indicated by QIAN, Xuesen to digital engineering. The method in which such "engineering technique" is combined with the digital computation engineering is called "digital engineering method of hybrid numeral carry system, carry line", and <<hybrid carry method HJF>2 > for short.

Part II Computer of Hybrid Numeral Carry System and Carry Line

The computer using the digital engineering method of hybrid numeral carry system and carry line is also called computer of hybrid numeral carry system and carry line or computer of hybrid numeral carry system, which performs computation by means of the "method of hybrid numeral carry system and carry line" using numerals of the "hybrid numeral carry system".

To make a clearer and more complete explanation, this part divides the computer of hybrid numeral carry system and carry line into four hierarchies. The first hierarchy is a general logical block diagram of the computer; the second hierarchy is the logical block diagram of operation and control of the computer, the third hierarchy is the logical block diagram of the arithmetic unit of the computer, and the fourth hierarchy is the logical block diagram of the arithmetic logical unit at the bottom layer. The structural features, operation mode and operation process of each hierarchy are illustrated with reference to a block diagram, especially the "digital flow", "digital transformation", "digital operation" and "digital control" in each hierarchy are illustrated.

FIG. 1 is the general logic block diagram of the computer of hybrid numeral carry system of the present invention. The computer using the method of digital engineering method of hybrid numeral carry system and carry line is composed of an input logic 101, a CPU central processing unit 102, an external storage 103, an output logic 104, a console 105, an output transformation logic 108, and an input transformation logic 109 (which can be omitted in the computer of hybrid Q-ary and carry line. The CPU 102 is composed of an internal memory 106 and a hybrid numeral computation control logic 107. The connection relations among these components are known in the art. Suppose that K common Q-ary numerals participate in the computation of addition and subtraction, K is an integer not less than 2, and Q is a natural number; the common Q-ary numeral input transformation logic 109 encodes these numerals into K or 2K numerals of hybrid numeral carry system, and the numerals of hybrid numeral carry system are input to the K- or 2K-layer arithmetic unit 202 through the shift register input logic 101; in the K- or 2K-layer arithmetic unit 202, the results of the numerals of hybrid numeral carry system are obtained through computations of K or 2K layer; then they are output by the output transformation logic 108 in the form of numerals of hybrid numeral carry system or common Q-ary numerals or common decimal numerals through the output logic 104; the controller 201 coordinates and controls the logic of the entire computation controller. The internal memory 106 and external storage 103 exchange data with the computation control logic 107 to execute the original program. The general operation is controlled by the console 105 according to predetermined program and is realized in the form of clock pulse.

Figure 2:
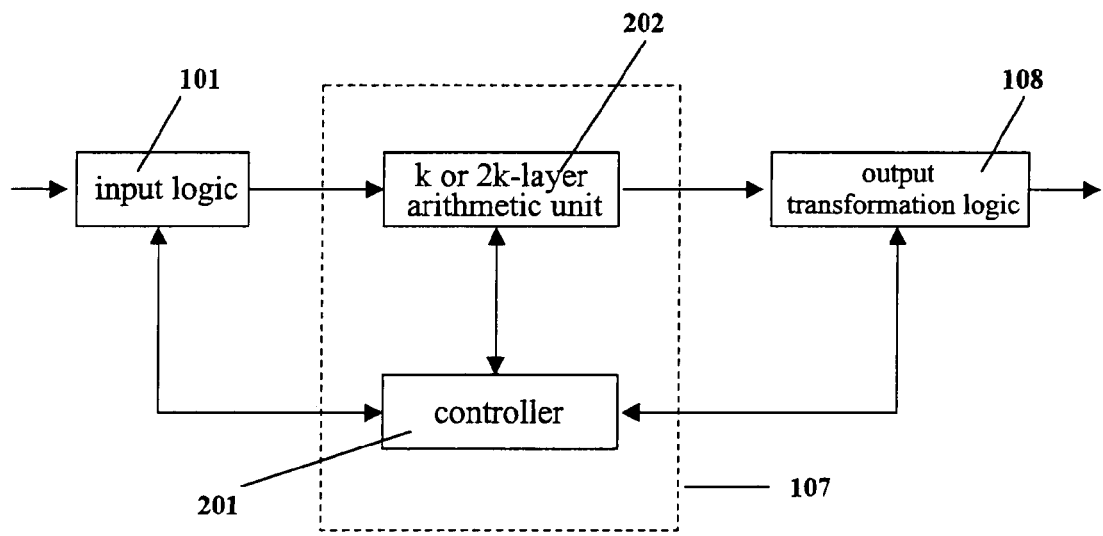
FIG. 2 is the logic block diagram of the computer (operation control) using hybrid numeral carry system and carry line.

FIG. 2 is the logic block diagram of the computer of hybrid numeral carry system and carry line (computation control), which comprises an input logic 101, a K- or 2K-layer arithmetic unit 202, an output transformation logic 108 and a controller 201. Wherein, the controller 201 and the K- or 2K-layer arithmetic unit 202 form the hybrid numeral computation control logic 107. The common Q-ary numerals are encoded and transformed into numerals of hybrid numeral carry system through the transformation logic 109. Numerals of hybrid numeral carry system are input to the CPU 102 through the input logic 101. When using all one code to encode, it only needs to assign the positive or negative signs of these all one encoded {Q} numerals to each place of the all one codes of these numerals, then they are encoded and transformed into numerals of hybrid numeral carry system of all one code by the transformation logic 109. The input logic 101 is an all one code shift register. The numerals of hybrid numeral carry system are sent to the K- or 2K-layer arithmetic unit 202, in which the results of the numerals of hybrid numeral carry system are obtained through K or 2K layers of computations, and the results are output by the output logic 104 in the form of numerals of hybrid numeral carry system or common Q-ary numerals or common decimal numerals through the decoder output transformation logic 108. The controller 201 coordinates and controls the logic of the entire computation controller.

Figure 3:
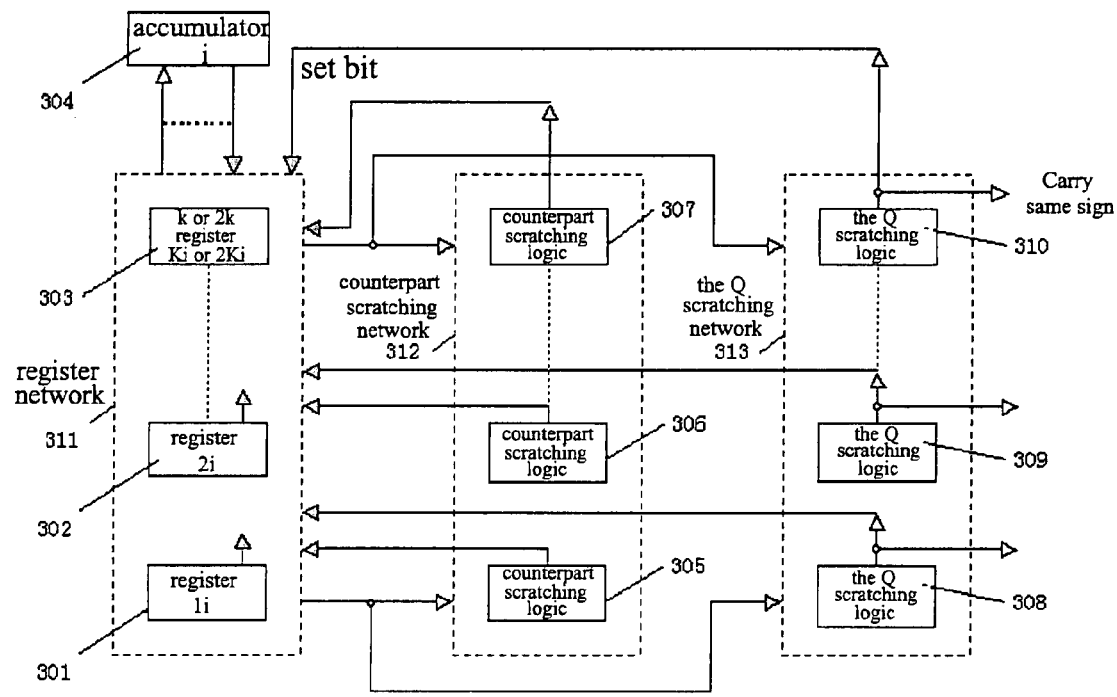
FIG. 3 is the logic block diagram of i-th place of the K or 2K-layer arithmetic unit.

FIG. 3 is the logic block diagram of the i-th place of the K- or 2K-layer arithmetic unit, i is an ordinal number. The computation of numerals of hybrid numeral carry system can use one of the previously described solution 1, solution 2, solution 3 and solution 4, while in the computer of the present invention; solution 2 is used for depiction: ① common Q-ary numeral is encoded or otherwise transformed into numeral of hybrid numeral carry system; and the numeral of hybrid numeral carry system is encoded into "all one code"; ② "all one code" computation ("counterpart scratching", "scratching Q", "accumulating"); ③ "all one code" is decoded into numeral of hybrid numeral carry system; and the numeral of hybrid numeral carry system is decoded or otherwise transformed into common Q-ary numeral.

"K- or 2K-layer arithmetic unit" 202 is composed of 304 accumulator $\Sigma i$, register network 311, counterpart scratching network 312 and Q scratching network 313; i is an ordinal number. When it is used in a computing machine, especially in the arithmetic unit of a computer, the digital engineering method can use the previously described first, second or third process, and the third process is used herein, in which step 1: suppose that K common Q-ary numerals participate in the computation of addition and subtraction, K is an integer and $K \geq 2$, and Q is a natural numeral; and these numerals are transformed into K or 2K numerals of hybrid carry system;

step 2: the so-called "two-dimensional computation" is adopted, i.e., computation is performed at each place of the K or 2K numerals at the same time, meanwhile, "counterpart scratching" is performed on the n numerals whose sum is 0 at each place; n is an integer and n≧2;

step 3: the so-called "two-dimensional computation" is adopted, i.e., computation is performed at each place of the K or 2K numerals at the same time, meanwhile, "scratching Q" is performed on n numerals whose sum is mQ at each place; n is an integer and n≧2, m is an integer; the obtained "hybrid numeral carry" is stored at the empty place or zero place of the adjacent higher place of any data line in the next computation layer;

step 4: the so-called "two-dimensional computation" is adopted, i.e., computation is performed at each place of the K or 2K numerals at the same time, meanwhile, the rest of the numerals at each place are "accumulated"; or they are directly moved to the next computation layer; the accumulation is "multiple (not less than 2) numerals accumulation"; when common "accumulation" of two numerals is adopted, sequential serial accumulation is performed;

step 5: in the next computation layer, the computations for sum as described in the above steps 2, 3 and 4 are performed on said "sum by place" numeral and the "carry" numeral; this processing is repeated until only one numeral is obtained by the computation in the computation layer; then the number of the sum finally obtained by addition computation with hybrid numeral carry system is just the result of addition and subtraction computations on the K common Q-ary numerals.

The register network 311 is composed of a 301 register $1i$, a 302 register $2i$, a 303 register Ki or 2Ki, and the register are connected to one another. The K or 2K registers store the input K or 2K numerals of hybrid numeral carry system. The 304 accumulator $\Sigma i$ is corresponding to the 303 register Ki or 2Ki for storing the sum of accumulation. Each bit of each register and the 304 accumulator $\Sigma i$ is assigned with a sign, and said bit of sign is a common two-state flip-flop; the place of the sign can also be stored in a special register for the bit of the sign. During computation, each bit of the register or accumulator that stores the numerals of the hybrid numeral carry system is assigned with a sign. K or 2K registers store K or 2K numerals of the hybrid numeral carry system.

Under the control of the computation instruction, the k- or 2K-layer arithmetic unit 202 uses the so-called "two-dimensional computation", that is, computation is performed on each of the places of the numeral at the same time; and all the numerals on each place are also computed at the same time. Then the numeral of the "partial sum" is sent to the register network 311 to replace the originally stored numeral, and the carry is sent to the adjacent higher place in the register network 311 to replace the original numeral. When the instruction of the next computation layer arrives, the numeral of carry is added to the numeral of "sum by place". This process is repeated until only one numeral is obtained after computation in the computation layer. Finally, the obtained sum is output through the 304 accumulator $\Sigma i$.

In the arithmetic unit of the computer of the present invention, in addition to using a common accumulator for computation, the logic of "counterpart scratching" and "Q scratching" can be used to accelerate the computation. When the computation for sum is performed for n numerals in K or 2K numerals, if, at a certain place, the "sum by place" of n computation numbers is zero, but a carry m (which has the same sign as the sum of the n numerals) is produced; n is an integer and n≧2, m is an integer, the carry is put into the next computation layer or at the empty place or zero place of the adjacent higher place of any data line that has not undergone the computation in the present computation layer; then a certain place of the n computation numbers are set to be "0" in a logical manner so that they will not participate in the subsequent computations, this is called "scratching Q"; in "scratching Q", when m=0, it is called "counterpart scratching"; or "counterpart scratching" and "scratching Q" may not be adopted. The logical lines of "counterpart scratching" and "scratching Q" are well-developed technically, wherein "counterpart scratching" and "scratching Q" use the "scratching Q" having n=2, Q, m=0, ±1, and the elements in the computer are two-value elements.

The "counterpart scratching" and "Q scratching" can use the counterpart scratching network 312 and the Q scratching network 313. the counterpart scratching network 312 is inspected by a counterpart scratching logic 305, or it is formed by connecting the K (K−1)/2 or K (K−1) counterpart scratching logic 305, counterpart scratching logic 306, . . . , counterpart scratching logic 307 to the respective registers in the register network 311. The counterpart scratching logic and Q scratching network logic can be graded and grouped according to the need of the circuit.

If "counterpart scratching" and "Q scratching" are not adopted, the controller or program sends instructions to perform computations of "counterpart scratching" and "scratching Q" on each place of each numeral, and the carry generated by "scratching Q" is sent to the setting "1" end of the empty or zero place of the adjacent higher place of any register in the K- or 2K-layer arithmetic unit 202, then accumulation is performed. The accumulation uses "multiple-numeral accumulator", which are not less than 2; when the common two-numeral "accumulator" is adopted, the accumulation is performed sequentially and serially. When all one code is used for encoding, the 304 accumulator $\Sigma i$ in the K- or 2K-layer arithmetic unit 202 can be omitted as an all one code shift register which specially stores the numerals of the resulted sums, so it is called "sum numeral register". If "two-dimensional computation" is adopted at this time, it is called "three-dimensional computation", and the corresponding arithmetic unit is called "three-dimensional arithmetic unit"

In said "K- or 2K-layer arithmetic unit", if the value of K or 2K is large, a graded and grouped amplification could be performed thereon.

Figures 4, 5:
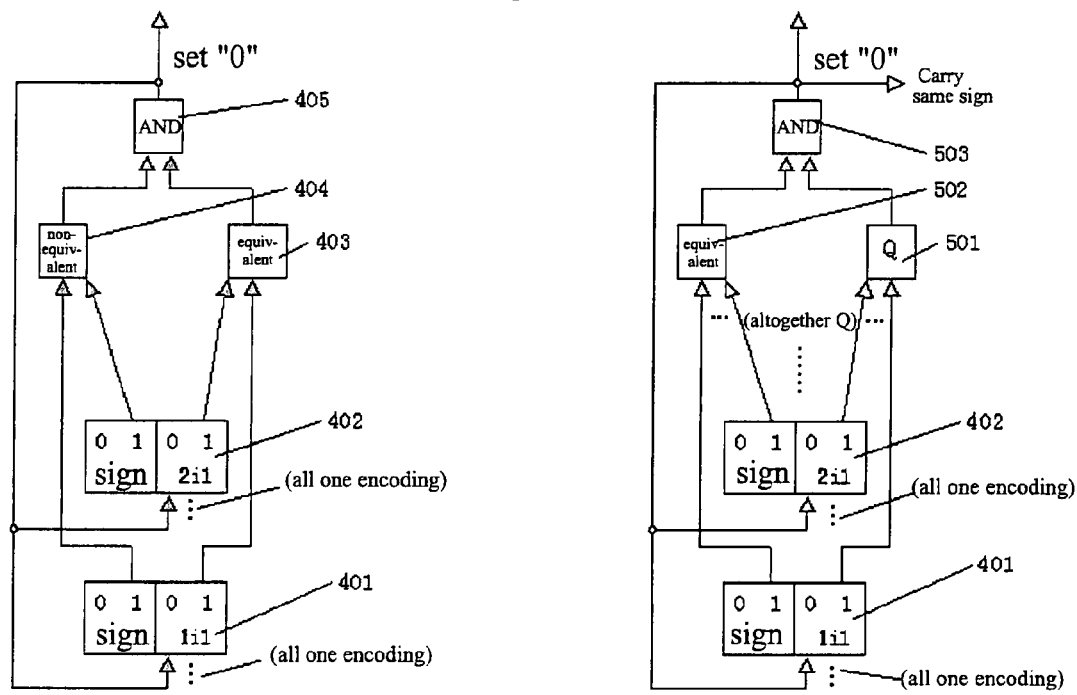
FIG. 4 is logic block diagram of the counterpart scratching logic (counterpart scratcher)
FIG. 5 is the logic block diagram of the scratching Q logic (Q-scratcher).

FIG. 4 is logic block diagram of the counterpart scratching logic (counterpart scratcher). A typical combination of the counterpart scratching logic comprises 301 register $1i$, 302 register $2i$, equivalent logic 403, different logic 404 and AND gate 405. A sign bit is attached before the 301 register $1i$ and 302 register $2i$, which is a common two-state flip-flop. When using all one code to encode and using a two-value device, the counterpart scratching uses n=2 and m=0. For 301 register $1i$, the all one encoding includes 401 bits $1i1$, $1i2$, . . . ; for 302 register $2i$, the all one encoding includes 402 bits $2i1$, $2i2$ . . . ; for 303 register Ki or 2Ki, the all one encoding includes Ki1, Ki2, . . . or 2Ki1, 2Ki2, . . . ; in the entirety of the all one encoding from $1i1$, $1i2$, . . . and $2i1$, $2i2$, . . . to Ki1, Ki2, . . . or 2Ki1, 2Ki2, . . . , any two are taken to form a combination; for example, a typical combination is taken as follows: in the 401th bit $1i1$ of 301 register $1i$, the "1" end thereof connects to the input of the equivalent logic 403, and the "1" end of $1i1$ sign is connected to the input of the different logic 404; in the 402th bit $2i1$ of 302 register $2i$, the "1" end thereof connects to the input of the equivalent logic 403, and the "1" end of $2i1$ sign is connected to the input of the different logic 404; the output of the equivalent logic 403 is connected to the input of the AND gate 405; the output of the different logic 404 is connected to the input of the AND gate 405; the output of the AND gate 405 is connected to the setting "0" ends of the 1i1 of the 401th bit of 301 register 1i and the 2i1 of the 402th bit of the 302 register 2i.

FIG. 5 is the logic block diagram of the scratching Q logic (Q scratcher), which a typical combination of the scratching Q logic comprises 301 register 1i, 302 register 2i, Q value determination logic 501, equivalent logic 502 and AND gate 503. A sign bit is attached before the 301 register 1i and 302 register 2i, which is a common two state flip-flop. When using all one code to encode and using a two-value device, the scratching Q uses n=Q and m=±1. For 301 register 1i, the all one encoding includes 401 bits 1i1, 1i2, . . . ; for 302 register 2i, the all one encoding includes 402 bits 2i1, 2i2 . . . ; for 303 register Ki or 2Ki, the all one encoding includes Ki1, Ki2, . . . or 2Ki1, 2Ki2, . . . ; in the entirety of the all one encoding from 1i1, 1i2, . . . and 2i1, 2i2, . . . to Ki1, Ki2, . . . or 2Ki1, 2Ki2, . . . , any Q are taken to form a combination; for example, a typical combination is taken as follows: the "1" end of the 401th bit 1i1 is connected to the input of the Q value determination logic 501, and the "1" end of 1i1 sign is connected to the input of the equivalent logic 502; the "1" end of the 402th bit 2i1 is connected to the input of the Q value determination logic 501, and the "1" end of 2i sign is connected to the input of the equivalent logic 502; there are altogether Q such connections. The Q value determination logic 501 receives altogether Q inputs; the output of the Q value determination logic 501 is connected to the input of the AND gate 503. The equivalent logic 502 receives altogether Q inputs, the output of the equivalent logic 502 is connected to the input of the AND gate 503. The carry (same sign) output from the AND gate 503 is sent to the "1" end of the adjacent higher place of any carry line register in the K or 2K-layer arithmetic unit 202, and the numerical sign of said higher place is set to be the same as the 1i sign. Meanwhile, AND gate 503 outputs a carry to be connected to 1i1 of the 401th bit of the 301 register 1i, 2i1 of the 402th bit of the 302 register 2i and the Q setting "0" ends in the combination.

In the computer using hybrid numeral carry system and carry line, the numeral for computation is numeral of hybrid numeral carry system, Q is a natural number. Said numeral is encoded by all one code, or by numeral of hybrid numeral carry system, or it may not be encoded. When it is encoded by all one code, that is, each place of numeral S of the respective hybrid numeral carry system is corresponded by 1 with the number of |s| arranged from the lowest place to the higher place, and the rest of the higher places are 0, and the total number of places is Q or (Q−1) or Q/2 or (Q+1)/2; meanwhile, the numeral sign of S, i.e., the sign that indicates if the numeral of said place is positive or negative, is used as the numeral sign of each place in the corresponding all one code. When all one code is used to encode the numeral of hybrid numeral carry system, the addition of n numerals is only the non-repetitive arrangement of 1 or $\bar{1}$ of the n numerals; and the encoding and decoding of the all one code could use either fixed code length or variable code length. The computer of the present invention uses the fixed code length.

The elements used in the computer of the present invention are P-value elements, P is the radix of the numerical element set, P is an integer and P>1; or the two-value elements or three-value elements are used. When encoding by all one code, the computation of hybrid numeral and the control thereof are carried out in a three-state $\{\bar{1}, 0, 1\}$, so the elements in the computer of the present invention shall use three-value elements. When two-value elements are used, the positive and negative signs of $\bar{1}$ and 1 are indicated by one bit of {two} numeral, and the weight thereof is 0. That is, the three-state $\{\bar{1}, 0, 1\}$ are encoded by two bits of {two} numeral. At this time, the 304 accumulator $\Sigma i$ in the K- or 2K-layer arithmetic unit 202 can be omitted as an all one code common shift register.

During computation of hybrid numerals, the input of the arithmetic unit needs to transform the {Q} numeral into hybrid numeral. On the other hand, the output of the arithmetic unit does not need to transform the hybrid numeral into {Q} numeral in the general intermediate process. Only when there is the need to output the final result, the hybrid numeral is transformed into {Q} numeral (the substance is that only the pure hybrid numeral is transformed into {Q} numeral). At this time, only a decoder for transforming hybrid numeral into {Q} numeral needs to be added on the output interface of the numeral "computation" in the computer of the present invention. Theoretically, the external storage and input and output of the computer of the present invention are completely the same as the existing {Q} computer (including the programs).

In the computer system of the present invention, the "multi-layer arithmetic unit" is adopted. For example, "8-layer arithmetic unit" is adopted. The so-called "8-layer arithmetic unit" is putting 8 numerals into 8 registers to finish the adding and subtracting computations at one time. Suppose that the multi-layered numeral is K or 2K, and it is preferable that K or 2K=2t (t is a natural number). Thus, K=2, 4, 8, . . . , wherein it is more practical that K or 2K=8, 16, 256, 1024, 4096, etc. Meanwhile, multiplication substantially is successive addition, and division substantially is successive subtraction, so in multiplication and division, the computer of the present invention could also use multi-layered multiplication and division in processing.

Particularly, when using all one code to encode, the computer of hybrid numerals only needs to perform "counterpart scratching" first and then "scratching Q" so as to obtain the result of hybrid numeral computation. Only when the final result needs to be output, the hybrid numeral is transformed into {Q} numeral or {ten} numeral to be output.

SUMMARY

The computer of the present invention is hybrid numeral computer and is the computer of <<hybrid carry method HJF>2 >.

The computer of hybrid numeral carry system and carry line greatly improves the computation speed of various computers, including super-conduct computer", "quanta computer", etc., based on other principles at present and in the future. Take the 8-layer arithmetic unit as an example, it is roughly estimated that it could increase the operational speed by 5 times, in other words, the former speed of 200000 times/s is increased to 1000000 times/s; and the former speed of 2 billion times/s is increased to about 10 billion times/s.

What is claimed is:

1. A computer of hybrid numeral carry system and carry line, characterized by comprising an input logic, a CPU, an external storage, an output logic, a console, an output transformation logic, and an input transformation logic (which is omitted in the computer of hybrid Q-ary and carry line); wherein the CPU central processing unit is composed of an internal memory and a hybrid numeral computation control logic; the hybrid numeral computation control logic is composed of K- or 2K-layer arithmetic unit and controller; suppose that K common Q-ary numerals participate in the computation of addition and subtraction, K is an integer not less than 2, and Q is a natural number; the common Q-ary numeral input transformation logic encodes these numerals into K or 2K numerals of hybrid numeral carry system, and the numerals of hybrid numeral carry system are input to the K- or 2K-layer arithmetic unit through the shift register input logic 101; in the K- or 2K-layer arithmetic unit, the results of the numerals of hybrid numeral carry system are obtained through computations of K or 2K layer; then they are output by the output transformation logic in the form of numerals of hybrid numeral carry system or common Q-ary numerals or common decimal numerals through the output logic; the controller coordinates and controls the logic of the entire computation controller.

2. The computer of hybrid numeral carry system and carry line according to claim 1, characterized in that the computer of hybrid numeral carry system and carry line uses the "method of hybrid numeral carry system and carry line" for computation, where Q is a natural number; the computation of hybrid numeral carry system uses one of the following four solutions:

solution 1 (suitable for computer and written calculation engineering):
① the common Q-ary numeral is encoded or otherwise transformed into numeral of hybrid carry system;
② hybrid numeral carry system computation ("counterpart scratching", "scratching Q", "accumulating");
③ numeral of hybrid numeral carry system is decoded or otherwise transformed into common Q-ary numeral;

solution 2 (suitable for computer, abacus, or for written calculation engineering, or it is left un-used):
⓪ common Q-ary numeral is encoded or otherwise transformed into numeral of hybrid numeral carry system; and the numeral of hybrid numeral carry system is encoded into "all one code";
② "all one code" computation ("counterpart scratching", "scratching Q", "accumulating");
③ "all one code" is decoded into numeral of hybrid numeral carry system; and the numeral of hybrid numeral carry system is decoded or otherwise transformed into common Q-ary numeral;

solution 3 (suitable for computer):
① the common Q-ary numeral is encoded or otherwise transformed into numeral of hybrid numeral carry system; and the numeral of hybrid numeral carry system is encoded or otherwise transformed into $\{0, \pm1\}$ binary numeral (a special case thereof is "common binary numeral");
② $\{0, \pm1\}$ binary computation ("counterpart scratching", "scratching Q", "accumulating");
③ the $\{0, \pm1\}$ binary numeral is decoded or otherwise transformed into numeral of hybrid numeral carry system; and the numeral of hybrid numeral carry system is decoded or transformed into common Q-ary numeral;

solution 4 (suitable for computer):
① the common Q-ary numeral is encoded or otherwise transformed into numeral of hybrid numeral carry system; and the numeral of hybrid numeral carry system is encoded or transformed into "encoded $\{0, \pm1\}$ binary numeral" (a special case thereof is "encoded common binary numeral");
② "encoded $\{0, \pm1\}$ binary numeral" computation ("counterpart scratching", "scratching Q", "accumulating");
③ the "encoded $\{0, \pm1\}$ binary numeral" is decoded or otherwise transformed into numeral of hybrid numeral carry system; and the numeral of hybrid numeral carry system is decoded or otherwise transformed into common Q-ary numeral, the computer of the present invention uses solution 2 for depiction; further comprising: the K- or 2K-layer arithmetic unit is composed of accumulator $\Sigma i$, register network, counterpart scratching network and Q scratching network; i is an ordinal number; when it is used in a computing machine, especially in the arithmetic unit of a computer, the digital engineering method uses one of the following three processes: in the first process, step 1: suppose that K common Q-ary numerals participate in the computations of addition and subtraction, K is an integer and $K \geq 2$, and Q is a natural numeral; and these numerals are transformed into K or 2K numerals of hybrid carry system;

step 2: two of the K or 2K numerals are added for sum by using the hybrid numeral carry system; the computation starts from the lowest place or the numerals at all places are added by place simultaneously, that is, at a certain place, said two numerals are added by place; then the sum of "adding by place" of said two numerals at said place is obtained by "counterpart scratching", "scratching Q", and "accumulating"; said sum is taken into the next computation layer as the "partial sum" numeral; meanwhile, the obtained "hybrid numeral carry" is stored in the next computation layer or at the empty place or zero place of the adjacent higher place of any data line that has not undergone the computation in the present computation layer;

step 3: at the higher place adjacent to said certain place, the computation of step 2 is repeated; this processing is repeated until the highest places of said two numerals have been computed; when parallel computation is adopted, computations in steps 2 and 3 are performed on each place of the two numerals at the same time, then the present step is skipped; when serial and parallel computation is adopted, the processing is similar;

step 4: another two numerals of the K or 2K numerals are taken to perform the computations in steps 2 and 3; this processing is repeated until all the numerals in the K or 2K numerals or in the computation layer have been taken; when there is only one numeral left, it is directly moved to the next computation layer as the "partial sum" numeral;

step 5: in the next computation layer, the computations for the sum as described in the previous steps 2, 3 and 4 are performed on said "sum by place" numeral and the "carry" numeral; this processing is repeated until only one numeral is obtained after the computation in the computation layer; then the number of the sum finally obtained by addition computation with hybrid numeral carry system is just the result of addition and subtraction computations on the K common Q-ary numerals;

or in the second process:

step 1: suppose that K common Q-ary numerals participate in the computation of addition and subtraction, K is an integer and $K \geq 2$, and Q is a natural numeral; and these numerals are transformed into K or 2K numerals of hybrid carry system;

step 2: starting from the lowest place, that is, two to K or 2K numerals are taken to be added at the same time at a certain place; "counterpart scratching", "scratching Q" and "accumulating" are adopted; that is, when two numerals are taken, the sum of "adding by place" of said two numerals at said place is obtained and is taken into the next computation layer as the "partial sum" numeral; meanwhile, the obtained "hybrid numeral carry" is stored in the next computation layer or at the empty place or zero place of the adjacent higher place of any data line that has not undergone the computation in the present computation layer;

step 3: another two numerals are taken from the K or 2K numerals to perform the computation of step 2; this processing is repeated until the K or 2K numerals or all the numerals in computation layer have been taken; when there is only one numeral left, it is directly moved to the next computation layer as the "partial sum" numeral; when each of the numerals at the same place are computed at the same time, the computations of steps 2 and 3 are performed at the same time, then the present step is skipped; at this time, "counterpart scratching" is first performed on the n numerals whose sum is 0 at the same place; then "scratching Q" is performed on n numerals whose sum is mQ; n is an integer and n≧2, m is an integer; the obtained "hybrid numeral carry" is stored in the next computation layer or at the empty place or zero place of the adjacent higher place of any data line that has not undergone the computation in the present computation layer; at the same place, the rest numerals are "accumulated" or are directly moved to the next computation layer; the accumulation is "multiple (not less than 2) numerals accumulation", when the common "accumulation" of two numerals is adopted, sequential serial accumulation is performed;

step 4: at the higher place adjacent to said certain place, the computations in steps 2 and 3 are repeated, and this processing is repeated until computation has been performed on the highest place of the K or 2K numerals;

step 5: in the next computation layer, the computation for sum as described in the above steps 2, 3 and 4 is performed on said "sum by place" numeral and the "carry" numeral; this processing is repeated until only one numeral is obtained by the computation in the computation layer; then the number of the sum finally obtained by addition computation with hybrid numeral carry system is just the result of addition and subtraction computations on the K common Q-ary numerals;

or in the third process:

step 1: suppose that K common Q-ary numerals participate in the computation of addition and subtraction, K is an integer and K≧2, and Q is a natural numeral; and these numerals are transformed into K or 2K numerals of hybrid carry system;

step 2: the so-called "two-dimensional computation" is adopted, i.e., computation is performed at each place of the K or 2K numerals at the same time, meanwhile, "counterpart scratching" is performed on the n numerals whose sum is 0 at each place; n is an integer and n≧2;

step 3: the so-called "two-dimensional computation" is adopted, i.e., computation is performed at each place of the K or 2K numerals at the same time, meanwhile, "scratching Q" is performed on n numerals whose sum is mQ at each place; n is an integer and n≧2, m is an integer; the obtained "hybrid numeral carry" is stored at the empty place or zero place of the adjacent higher place of any data line in the next computation layer;

step 4: the so-called "two-dimensional computation" is adopted, i.e., computation is performed at each place of the K or 2K numerals at the same time, meanwhile, the rest of the numerals at each place are "accumulated"; or they are directly moved to the next computation layer; the accumulation is "multiple (not less than 2) numerals accumulation"; when common "accumulation" of two numerals is adopted, sequential serial accumulation is performed;

step 5: in the next computation layer, the computations for sum as described in the above steps 2, 3 and 4 are performed on said "sum by place" numeral and the "carry" numeral; this processing is repeated until only one numeral is obtained by the computation in the computation layer; then the number of the sum finally obtained by addition computation with hybrid numeral carry system is just the result of addition and subtraction computations on the K common Q-ary numerals, and the third process is used herein;

the "two-dimensional computation" is adopted in the K- or 2K-layer arithmetic unit, that is, computation is performed at each place of the numeral at the same time, and "counterpart scratching", "scratching Q" and "accumulating" are performed in turn on all the numerals at each place at the same time; when the instruction of the next computation layer arrives, the carry numeral and the "sum by place" numeral are added; this process is repeated until only one numeral is left after computation in the computation layer; finally, the obtained sum is output by the accumulator Σi; when all one code is used for encoding, said "two-dimensional computation" is "three-dimensional computation";

when the "counterpart scratching" and "Q scratching" are adopted, instructions are sent by the controller or program to compute on each place of the numeral at the same time; and for the numerals at each place, "counterpart scratching" and "Q scratching" are also performed in turn at the same time; then a certain place of the n numerals is set as "0" in a logical manner so that it does not participate in future computation; next, "accumulation" is performed, and the accumulation uses "multiple-numeral accumulator", which are not less than 2; when the common two-numeral "accumulator" is adopted, the accumulation is performed sequentially and serially; wherein the accumulator Σi is the accumulator corresponding to the Ki or 2Ki register with each bit thereof having a sign bit; when all one code is used for encoding, the accumulator Σi in the K- or 2K-layer arithmetic unit is omitted as an all one code shift register;

if the value of K or 2K is large, a graded and grouped amplification is performed thereon.

3. The computer of hybrid numeral carry system and carry line according to claim 2, characterized in that in the computer of hybrid numeral carry system and carry line, the register network is composed of register $1i$, register $2i$, register $Ki$ or $2Ki$, etc.; and every two of the registers are connected; k or 2K registers store the input K or 2K numerals of hybrid numeral system; the accumulator Σi is an accumulator corresponding to register Ki or 2Ki for storing the sum of accumulation; each bit of each register and the accumulator Σi is assigned with a sign bit which is a common two-state flip-flop; said sign bit is stored in the special sign bit register, and during computation, each bit of the register or accumulator for storing numerals of hybrid numeral carry system is assigned with a sign; K or 2K registers store K or 2K numerals of hybrid numeral carry system; wherein the counterpart scratching network is inspected by a counterpart scratching logic; or it is formed by connecting the K (K−1)/2 or K (2K−1) counterpart scratching logics to the respective registers in the register network; wherein the Q scratching network is inspected by a Q scratching logic, or is formed by connecting each one of the K (K−1)/2 or K (2K−1) Q scratching logics to the respective registers in the register network; the counterpart scratching logic and Q scratching logic is grouped or graded according to the need of the circuit.

4. The computer of hybrid numeral carry system and carry line according to claim 3, characterized in that in the computer of the digital engineering method of hybrid numeral carry system and carry line, a typical combination of the counterpart scratching logic comprises register $1i$, register $2i$, equivalent logic, different logic and AND gate; a sign bit is attached before the register $1i$ and register $2i$, which is a common two-state flip-flop; when using all one code to encode and using a two-value device, the counterpart scratching uses n=2 and m=0; for register $1i$, the all one encoding includes 401 bits $1i1$, $1i2$, . . . ; for register $2i$, the all one encoding includes 402 bits $2i1$, $2i2$ . . . ; for register Ki or 2Ki, the all one encoding includes Ki1, Ki2, or 2Ki1, 2Ki2, . . . ; in the entirety of the all one encoding from $1i1$, $1i2$, . . . and $2i1$, $2i2$, . . . to Ki1, Ki2, . . . or 2Ki1, 2Ki2, . . . , any two are taken to form a combination; for example, a typical combination is taken as follows: in the 401th bit $1i1$ of register $1i$, the "1" end thereof connects to the input of the equivalent logic, and the "1" end of $1i1$ sign is connected to the input of the different logic; in the 402th bit $2i1$ of register $2i$, the "1" end thereof connects to the input of the equivalent logic, and the "1" end of $2i1$ sign is connected to the input of the different logic; the output of the equivalent logic is connected to the input of the AND gate; the output of the different logic is connected to the input of the AND gate; the output of the AND gate is connected to the setting "0" ends of the $1i1$ of the 401th bit of register $1i$ and the $2i1$ of the 402th bit of the register $2i$; wherein a typical combination of the scratching Q logic comprises register $1i$, register $2i$, Q value determination logic, equivalent logic and AND gate; a sign bit is attached before the register $1i$ and register $2i$, which is a common two state flip-flop; when using all one code to encode and using a two-value device, the scratching Q uses n=Q and m=±1; for register $1i$, the all one encoding includes bits $1i1$, $1i2$, . . . ; for register $2i$, the all one encoding includes bits $2i1$, $2i2$ . . . ; for register Ki or 2Ki, the all one encoding includes Ki1, Ki2, . . . or 2Ki1, 2Ki2, . . . ; in the entirety of the all one encoding from $1i1$, $1i2$, . . . and $2i1$, $2i2$, . . . to Ki1, Ki2, . . . or 2Ki1, 2Ki2, . . . , any Q are taken to form a combination; for example, a typical combination is taken as follows: the "1" end of the 401th bit $1i1$ is connected to the input of the Q value determination logic, and the "1" end of $1i1$ sign is connected to the input of the equivalent logic; the "1" end of the 402th bit $2i1$ is connected to the input of the Q value determination logic, and the "1" end of $2i$ sign is connected to the input of the equivalent logic; there are altogether Q such connections; the Q value determination logic receives altogether Q inputs; the output of the Q value determination logic is connected to the input of the AND gate; the equivalent logic receives altogether Q inputs, the output of the equivalent logic is connected to the input of the AND gate; the carry (same sign) output from the AND gate is sent to the "1" end of the adjacent higher place of any carry line register in the K or 2K-layer arithmetic unit, that is, at the empty place or zero place of the adjacent high place of any data line that has not undergone the computation in the next computation layer or the present computation layer; and the numerical sign of said higher place is set to be the same as the $1i$ sign; meanwhile, AND gate outputs a carry to be connected to $1i1$ of the 401th bit of the 301 register $1i$, $2i1$ of the 402th bit of the register $2i$ and the Q setting "0" ends in the combination.

5. The computer of hybrid numeral carry system and carry line according to claim 4, characterized in that the numeral of hybrid numeral carry system is not encoded, or it is encoded by the numeral of hybrid numeral carry system, or it is encoded by all one code, that is, each place of numeral S of the respective numerals of the hybrid numeral carry system is corresponded by 1 with the number of |S| arranged from the lowest place to the higher places, and the rest of the higher places are 0; meanwhile, the sign of S, i.e., the sign that indicates if the numeral of said place is positive or negative, is used as the sign of each place in the corresponding all one code; the encoding and decoding of all one code use fixed code length or variable code length; the elements adopted are P-value elements, P is the radix of the numerical element set, P is an integer greater than 1; or the two-value elements are usually used, or the three-value elements are used.

\* \* \* \* \*